US011261951B2

(12) United States Patent
Tsuchida et al.

(10) Patent No.: US 11,261,951 B2
(45) Date of Patent: Mar. 1, 2022

(54) SHIFT POWER TRANSMISSION APPARATUS OF A TRACTOR AND TRACTOR

(71) Applicant: Kubota Corporation, Osaka (JP)

(72) Inventors: Tomonari Tsuchida, Sakai (JP); Hidetoshi Hana, Sakai (JP); Ryoma Iwase, Sakai (JP)

(73) Assignee: Kubota Corporation, Osaka (JP)

( * ) Notice: Subject to any disclaimer, the term of this patent is extended or adjusted under 35 U.S.C. 154(b) by 158 days.

(21) Appl. No.: 16/332,451

(22) PCT Filed: Nov. 20, 2018

(86) PCT No.: PCT/JP2018/042850
§ 371 (c)(1),
(2) Date: Mar. 12, 2019

(87) PCT Pub. No.: WO2019/102999
PCT Pub. Date: May 31, 2019

(65) Prior Publication Data
US 2021/0332875 A1 Oct. 28, 2021

(30) Foreign Application Priority Data
Nov. 24, 2017 (JP) .............................. JP2017-225543
Oct. 31, 2018 (JP) .............................. JP2018-205692

(51) Int. Cl.
*F16H 47/04* (2006.01)
*B60K 17/08* (2006.01)
(Continued)

(52) U.S. Cl.
CPC ............. *F16H 47/04* (2013.01); *B60K 17/08* (2013.01); *F16H 37/022* (2013.01); *B60Y 2200/221* (2013.01); *F16H 2037/0886* (2013.01)

(58) Field of Classification Search
CPC .................. F16H 47/04; F16H 37/022; F16H 2037/0886; B60K 17/08; B60Y 2200/221
See application file for complete search history.

(56) References Cited

U.S. PATENT DOCUMENTS 4,306,467 A * 12/1981 Pollman .................. F16H 47/04
475/81
2009/0270212 A1 10/2009 Ueda et al.
(Continued)

FOREIGN PATENT DOCUMENTS

EP 0818643 A2 1/1998
JP 4901382 B2 3/2012
(Continued)

*Primary Examiner* — Justin Holmes
(74) *Attorney, Agent, or Firm* — The Webb Law Firm

(57) ABSTRACT

A shift power transmission apparatus of a tractor that has a small up-down width or a small transverse width and a short front-rear length. A shift output unit is located further toward a vehicle rear side than a combined planetary power transmission unit. A planetary unit output axis and a shift unit input axis are coaxial with each other. A power transmission unit, that transmits motive power from an engine to a continuously variable transmission unit and the combined planetary power transmission unit, includes a rotary power transmission shaft, a pump transmission unit and a planetary transmission unit, the rotary power transmission shaft being interlockingly joined to an output shaft of the engine and extending in a direction along a vehicle front-rear direction, the pump transmission unit being configured to input motive power of the rotary power transmission shaft to the continuously variable transmission unit, and the planetary transmission unit being configured to input motive power of the rotary power transmission shaft to the combined planetary power transmission unit.

19 Claims, 14 Drawing Sheets

(51) Int. Cl.
*F16H 37/02* (2006.01)
*F16H 37/08* (2006.01)

(56) References Cited

U.S. PATENT DOCUMENTS

| | | |
|---|---|---|
| 2010/0151984 A1 | 6/2010 | Viitasalo et al. |
| 2011/0021302 A1* | 1/2011 | Panizzolo ............... F16H 47/04 475/207 |
| 2012/0125730 A1 | 5/2012 | Moloney |
| 2012/0225746 A1 | 9/2012 | Hiraoka et al. |
| 2014/0206502 A1 | 7/2014 | Dix et al. |
| 2014/0221155 A1 | 8/2014 | Petrigliano et al. |
| 2014/0222304 A1 | 8/2014 | Dix et al. |
| 2015/0072823 A1 | 3/2015 | Rintoo |
| 2015/0176705 A1 | 6/2015 | Dix et al. |
| 2016/0047449 A1* | 2/2016 | Vasudeva ................ F16H 47/04 475/31 |

FOREIGN PATENT DOCUMENTS

| | | | |
|---|---|---|---|
| JP | 2012062926 A | 3/2012 | |
| WO | WO-2005019697 A1 * | 3/2005 | ............. F16H 47/04 |

* cited by examiner

|  | | First gear clutch (CL1) | Second gear clutch (CL2) | Third gear clutch (CL3) | Fourth gear clutch (CL4) |
|---|---|---|---|---|---|
| Low speed range | First gear range | ON | — | — | — |
| | Second gear range | — | ON | — | — |
| High speed range | Third gear range | — | — | ON | — |
| | Fourth gear range | — | — | — | ON |

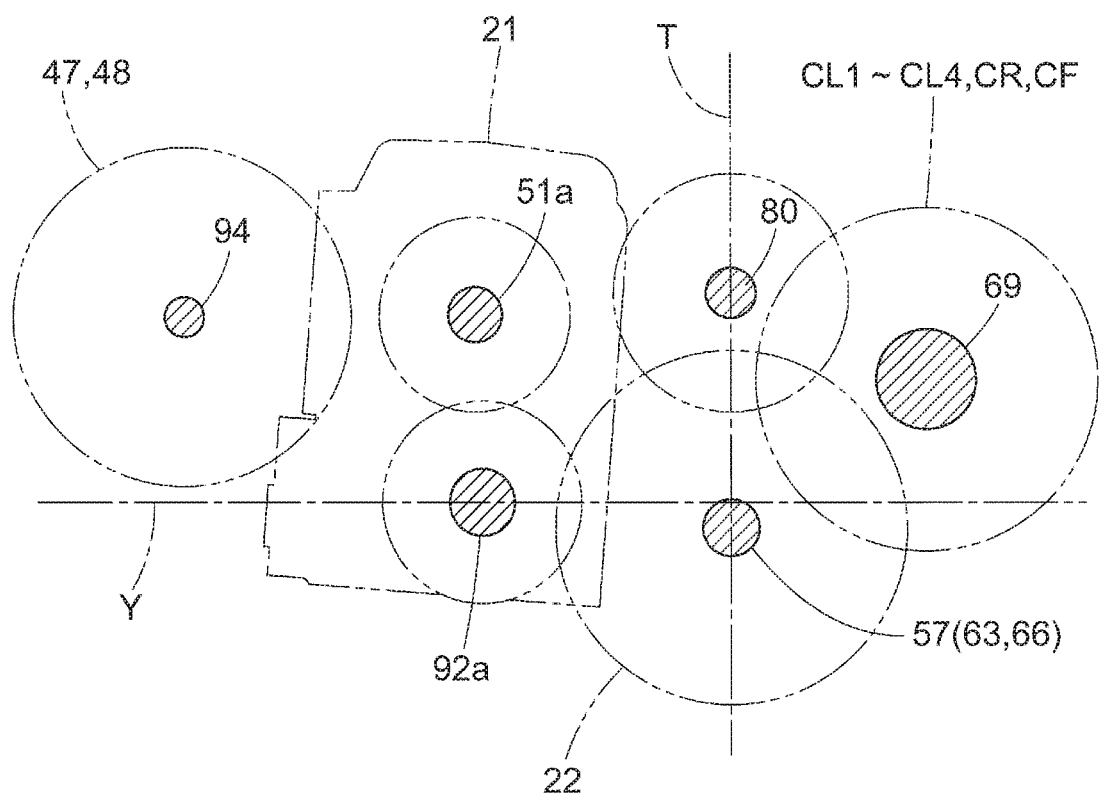

SHIFT POWER TRANSMISSION APPARATUS OF A TRACTOR AND TRACTOR

CROSS-REFERENCE TO RELATED APPLICATIONS

This application is the United States national phase of International Application No. PCT/JP2018/042850 filed Nov. 20, 2018, and claims priority to Japanese Patent Application Nos. 2017-225543 and 2018-205692, filed Nov. 24, 2017 and Oct. 31, 2018, respectively, the disclosures of which are hereby incorporated by reference in their entirety.

BACKGROUND OF THE INVENTION

Field of the Invention

The present invention relates to a shift power transmission apparatus of a tractor and a tractor that includes this shift power transmission apparatus of a tractor.

Description of Related Art

For example, a shift power transmission apparatus of a tractor disclosed in Patent Literature 1 includes a hydrostatic continuously variable (stepless) transmission unit, a combined planetary power transmission unit and a shift output unit. The continuously variable transmission unit includes a hydraulic pump and a hydraulic motor, and is configured to receive motive power of an engine and output motive power of stepless rotational speed by changing the speed of the received motive power. The combined planetary power transmission unit is configured to receive the speed-changed output of the continuously variable transmission unit and motive power of the engine that is not subjected to speed change action by the continuously variable transmission unit, and combine the received speed-changed output and motive power of the engine, and output the combined motive power. The shift output unit includes a plurality of stage clutches and a shift output shaft that supports the plurality of stage clutches in a state of being arranged in a vehicle front-rear direction. The shift output unit is configured to receive the combined motive power from the combined planetary power transmission unit, and divide the speed range of the received combined motive power into a plurality of stages, and output the received combined motive power from the shift output shaft toward a travel apparatus.

In this shift power transmission apparatus of a tractor, as a result of a speed change operation being performed on the continuously variable transmission unit and the plurality of stage clutches being appropriately switched in accordance with this speed change operation, a driving force from the engine is output toward the travel apparatus in such a manner that the speed range of the driving force is divided into a plurality of stages and the speed of the driving force is steplessly changed at each stage of the speed range. Since the combined planetary power transmission unit and the shift output unit including the stage clutches are employed, the speed range can be easily switched as compared with a case where a plurality of rows of non-combined planetary power transmission units and a sub gear transmission mechanism are employed. Also, as compared with a case where a large-capacity continuously variable transmission unit is employed to omit a sub transmission unit, it is possible to suppress a reduction in power transmission efficiency and cost increase. Further, the continuously variable transmission unit and the planetary mechanism can be downsized as compared with a case where a large number of rows of planetary mechanisms are employed.

Patent Literature 1: JP 4901382B2

The following is at issue regarding the background art.

In the shift power transmission apparatus of a tractor disclosed in Patent Literature 1, the shift output unit is located further toward the vehicle rear side than the combined planetary power transmission unit is, and a planetary output axis of the combined planetary power transmission unit is coaxial with a shift unit input axis of the shift output unit, and therefore the combined planetary power transmission unit and the shift output unit overlap when they are viewed in the vehicle front-rear direction, and the up-down width or the transverse width of the shift power transmission apparatus is kept relatively narrow. However, the continuously variable transmission unit is located further toward the vehicle rear side than the engine is and further toward the vehicle front side than the combined planetary power transmission unit is, and therefore the length of the shift power transmission apparatus in the vehicle front-rear direction is large. The shift power transmission apparatus increases the front-rear length of the vehicle body.

SUMMARY OF THE INVENTION

It is an object of the present invention to provide a compact shift power transmission apparatus of a tractor that not only has a small up-down width or a small transverse width but also has a short front-rear length.

The above object is fulfilled by the solution as below:

A shift power transmission apparatus of a tractor, the apparatus comprising:

a hydrostatic continuously variable transmission unit that includes a hydraulic pump and a hydraulic motor, and is configured to receive motive power of an engine and output motive power of stepless rotational speed by changing a speed of the received motive power;

a combined planetary power transmission unit that is configured to receive speed-changed output of the continuously variable transmission unit and motive power of the engine that is not subjected to speed change action by the continuously variable transmission unit, and combine the received speed-changed output and motive power of the engine, and output combined motive power; and a shift output unit that includes a plurality of stage clutches and a shift output shaft that supports the plurality of stage clutches in a state of being arranged in a vehicle front-rear direction, the shift output unit being configured to receive the combined motive power from the combined planetary power transmission unit, and divide a speed range of the received combined motive power into a plurality of stages, and output the received combined motive power from the shift output shaft toward a travel apparatus, wherein the continuously variable transmission unit is provided in a state where the continuously variable transmission unit is located further toward a vehicle rear side than the engine is, the continuously variable transmission unit having a motor shaft and a pump shaft that extend in the vehicle front-rear direction, the combined planetary power transmission unit is provided in a state where the combined planetary power transmission unit is located further toward the vehicle rear side than the engine is, the combined planetary power transmission unit having a single planetary unit input axis and a single planetary unit output axis, the planetary unit input axis extending in a direction along the vehicle front-rear direction and parallel to the motor shaft and the pump shaft, the shift output unit is provided in a state where the shift output unit is located further toward the vehicle rear side than the combined planetary power transmission unit is, the shift output unit having a single shift unit input axis that extends coaxial with the planetary unit output axis, the apparatus further comprises a power transmission unit that is configured to transmit the motive power of the engine to the continuously variable transmission unit and the combined planetary power transmission unit, the power transmission unit including a rotary power transmission shaft, a pump transmission unit and a planetary transmission unit, the rotary power transmission shaft being located further toward the vehicle rear side than the engine is in a state of being interlockingly joined to an output shaft of the engine, the rotary power transmission shaft extending in a direction along the vehicle front-rear direction and parallel to the motor shaft and the pump shaft, the pump transmission unit being configured to input motive power of the rotary power transmission shaft to the pump shaft, and the planetary transmission unit being configured to input motive power of the rotary power transmission shaft to the combined planetary power transmission unit, and the continuously variable transmission unit is located at the same position as at least one of the combined planetary power transmission unit and the shift output unit in the vehicle front-rear direction.

According to this configuration, the combined planetary power transmission unit and the shift output unit overlap when they are viewed in the vehicle front-rear direction, and the width of the shift power transmission apparatus can be made small in the vehicle up-down direction or vehicle transverse direction.

By focusing on the fact that the continuously variable transmission unit can be located at the same position as at least one of the combined planetary power transmission unit and the shift output unit in the vehicle front-rear direction in a configuration in which the power transmission unit that transmits motive power of the engine to the continuously variable transmission unit and the combined planetary power transmission unit includes the rotary power transmission shaft, the pump transmission unit that inputs motive power of the rotary power transmission shaft to the pump shaft, and the planetary transmission unit that inputs motive power of the rotary power transmission shaft to the combined planetary power transmission unit, the rotary power transmission shaft, the pump transmission unit, and the planetary transmission unit are provided in the power transmission unit, and the continuously variable transmission unit is located at the same position as at least one of the combined planetary power transmission unit and the shift output unit in the vehicle front-rear direction such that the continuously variable transmission unit is not located further toward the vehicle front side than the combined planetary power transmission unit is, and therefore the length of the shift power transmission apparatus in the vehicle front-rear direction can be reduced as compared with conventional length.

Therefore, the shift power transmission apparatus of a tractor of the present invention not only has a small up-down width or a small transverse width but also has a short front-rear length and can be installed in a tractor in a compact manner to avoid or reduce an increase in the size of the tractor.

In one preferred embodiment, the pump transmission unit is configured to input the motive power of the rotary power transmission shaft to the pump shaft by accelerating the motive power, and the apparatus further comprises a second planetary transmission unit that is configured to input motive power of the motor shaft to the combined planetary power transmission unit, the second planetary transmission unit being configured to input the motive power of the motor shaft by decelerating the motive power.

According to this configuration, motive power that is not affected or slightly affected by uneven rotation is output from the hydraulic motor as a result of the hydraulic pump being driven at a high speed in the continuously variable transmission unit, and motive power of an appropriate rotational speed that is not excessively high is input to the combined planetary power transmission unit.

In one preferred embodiment, the planetary transmission unit is located further toward a vehicle front side than the combined planetary power transmission unit is.

According to this configuration, a power transmission path of the planetary transmission unit can be formed as a simple straight path and interference between the planetary transmission unit and the combined planetary power transmission unit can be avoided.

In one preferred embodiment, the pump shaft is located further toward the vehicle rear side than the motor shaft is.

According to this configuration, it is easy to employ an arrangement in which a power transmission path for transmitting motive power of the motor shaft to the combined planetary transmission unit is located further toward the vehicle front side than the combined planetary power transmission unit is, and a power transmission path for transmitting motive power of the rotary power transmission shaft to the pump shaft is located further toward the vehicle rear side than the shift output unit is.

In one preferred embodiment, the pump shaft and the motor shaft are aligned in a straight line.

According to this configuration, it is possible to obtain a compact continuously variable transmission unit in which the pump shaft and the motor shaft are aligned in a straight line.

In one preferred embodiment, the pump transmission unit is located further toward the vehicle rear side than the shift output unit is.

According to this configuration, dead space on the vehicle rear side of the shift output unit can be utilized as the space for installing the pump transmission unit.

In one preferred embodiment, the apparatus further comprises a forward/reverse switching apparatus that is provided on a rear side of the shift output unit, the forward/reverse switching apparatus having an input shaft to which motive power that is output from the shift output shaft of the shift output unit is input, the forward/reverse switching apparatus being configured to output motive power of the input shaft to the travel apparatus by converting the motive power into forward travel motive power or reverse travel motive power, and wherein the shift output unit and the forward/reverse switching apparatus are arranged in a front-rear direction in a state where an axis of the input shaft and an axis of the shift output shaft are coaxial with each other.

the shift power transmission apparatus includes a forward/reverse switching apparatus that is provided on a rear side of the shift output unit, includes an input shaft to which motive power that is output from the shift output shaft of the shift output unit is input, and outputs motive power of the input shaft to the travel apparatus by converting the motive power into forward travel motive power or reverse travel motive power, and the shift output unit and the forward/reverse switching apparatus are arranged in a front-rear direction in a state where an axis of the input shaft and an axis of the shift output shaft are coaxial with each other.

According to this configuration, the input shaft is aligned in a straight line relative to the shift output shaft on the rear side of the shift output shaft, and therefore the shift output shaft and the input shaft can be interlockingly joined with a simple interlocking joint structure.

In one preferred embodiment, the apparatus further comprises a forward/reverse switching apparatus that is provided on a rear side of the shift output unit, the forward/reverse switching apparatus being configured to receive motive power that is output from the shift output unit, and output the received motive power from an output shaft to the travel apparatus by converting the motive power into forward travel motive power or reverse travel motive power, and wherein the shift output unit and the forward/reverse switching apparatus are arranged in a front-rear direction in a state where a shift unit input axis of the shift output unit and an axis of the output shaft are coaxial with each other.

According to this configuration, the output shaft is aligned in a straight line relative to the shift output unit on the rear side of the shift output unit, and therefore the shape of a transmission case that houses the shift output unit and the forward/reverse switching apparatus can be simplified.

The shift power transmission apparatus of a tractor of the present invention is applicable to a tractor.

In a tractor to which the shift power transmission apparatus of a tractor of the present invention is applied, the travel apparatus can be driven while being able to change gears within a wide shift range, and therefore it is easy to perform various types of work that are to be performed at different travel speeds.

BRIEF DESCRIPTION OF THE DRAWINGS

FIG. 16 is a front view illustrating arrangement of a continuously variable transmission unit, the combined planetary power transmission unit, stage clutches of the shift output unit, clutches of the forward/reverse switching apparatus, a rotary power transmission shaft, etc. in the power transmission structure according to the second embodiment.

DESCRIPTION OF THE INVENTION

Figure 1:
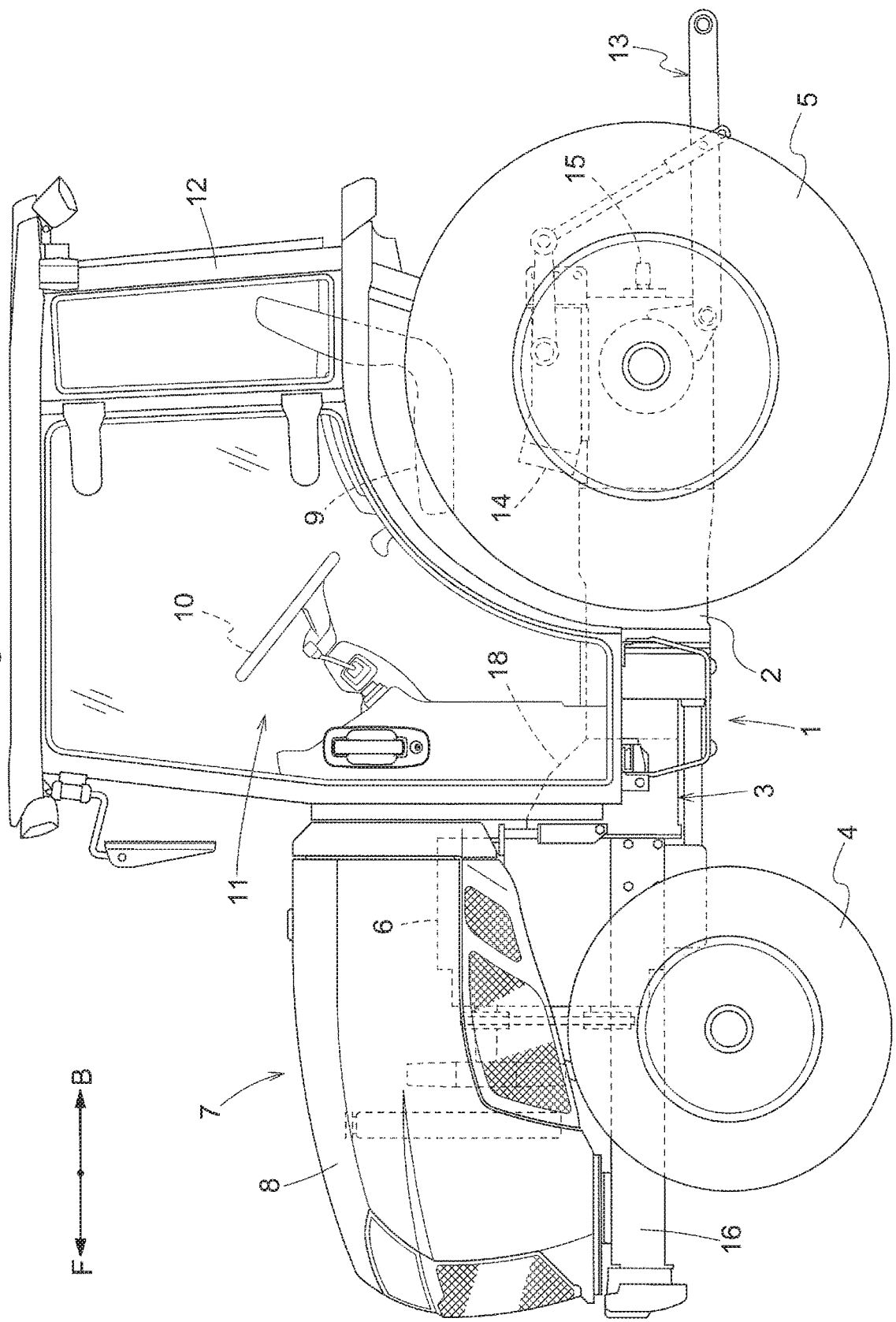
FIG. 1 is a left side view illustrating the entirety of a tractor.

Embodiments of the present invention will be described hereinafter with reference to the drawings. FIG. 1 is a left side view illustrating the entirety of a tractor. The direction indicated by 'F' in FIG. 1 is defined as a direction toward the front side of a travel vehicle body 1; the direction indicated by 'B' is defined as a direction toward the rear side of the travel vehicle body 1; the direction toward the front side of the sheet is defined as a direction toward the left side of the travel vehicle body 1; and the direction toward the back side of the sheet is defined as a direction toward the right side of the travel vehicle body 1.

Entirety of Tractor

As shown in FIG. 1, the tractor includes a travel vehicle body 1 that includes a vehicle body frame 3 constituted by a transmission case 2 and the like, and that includes a pair of right/left front wheels 4 that are travel apparatuses provided in a front portion of the vehicle body frame 3 so as to be drivable and steerable, and a pair of right/left rear wheels 5 that are travel apparatuses provided in a rear portion of the vehicle body frame 3 so as to be drivable. A prime mover unit 7 that includes an engine 6 is formed in a front portion of the travel vehicle body 1. The prime mover unit 7 is provided with an engine hood 8 that covers an engine compartment. A driving unit 11 that includes a driver seat 9 and a steering wheel 10 for steering the right/left front wheels 4 is formed in a rear portion of the travel vehicle body 1. The driving unit 11 is covered with a cabin 12. A link mechanism 13 extends from the rear portion of the travel vehicle body 1 toward the rear of the vehicle body so as to be swingable up and down. The link mechanism 13 is raised and lowered through extension and retraction operations of a hydraulic cylinder 14. A power take-off shaft 15 is provided in the rear portion of the travel vehicle body 1.

In the tractor, a rotary cultivating device (not shown) may be joined to the link mechanism 13 and motive power of the engine 6 may be transmitted from the power take-off shaft 15 to the rotary cultivating device to thereby provide a riding-type cultivator. Not only the rotary cultivating device but also various types of work implements such as a plow and a fertilizer spreading device can be joined to the travel vehicle body 1.

As shown in FIG. 1, the vehicle body frame 3 includes the engine 6, the transmission case 2 that is joined, at its front portion, to a rear portion of the engine 6, and a front frame 16 that extends from a lower portion of the engine 6 toward the front of the vehicle body. The engine 6 and the transmission case 2 are joined via a clutch housing 18 that is provided in the rear portion of the engine 6. The right/left front wheels 4 are supported by the front frame 16 via a front wheel drive case 17 (see FIG. 2). The right/left rear wheels 5 and the link mechanism 13 are supported by a rear portion of the transmission case 2. The hydraulic cylinder 14 is provided inside an upper portion of the transmission case 2.

Power Transmission Structure

Figure 2:
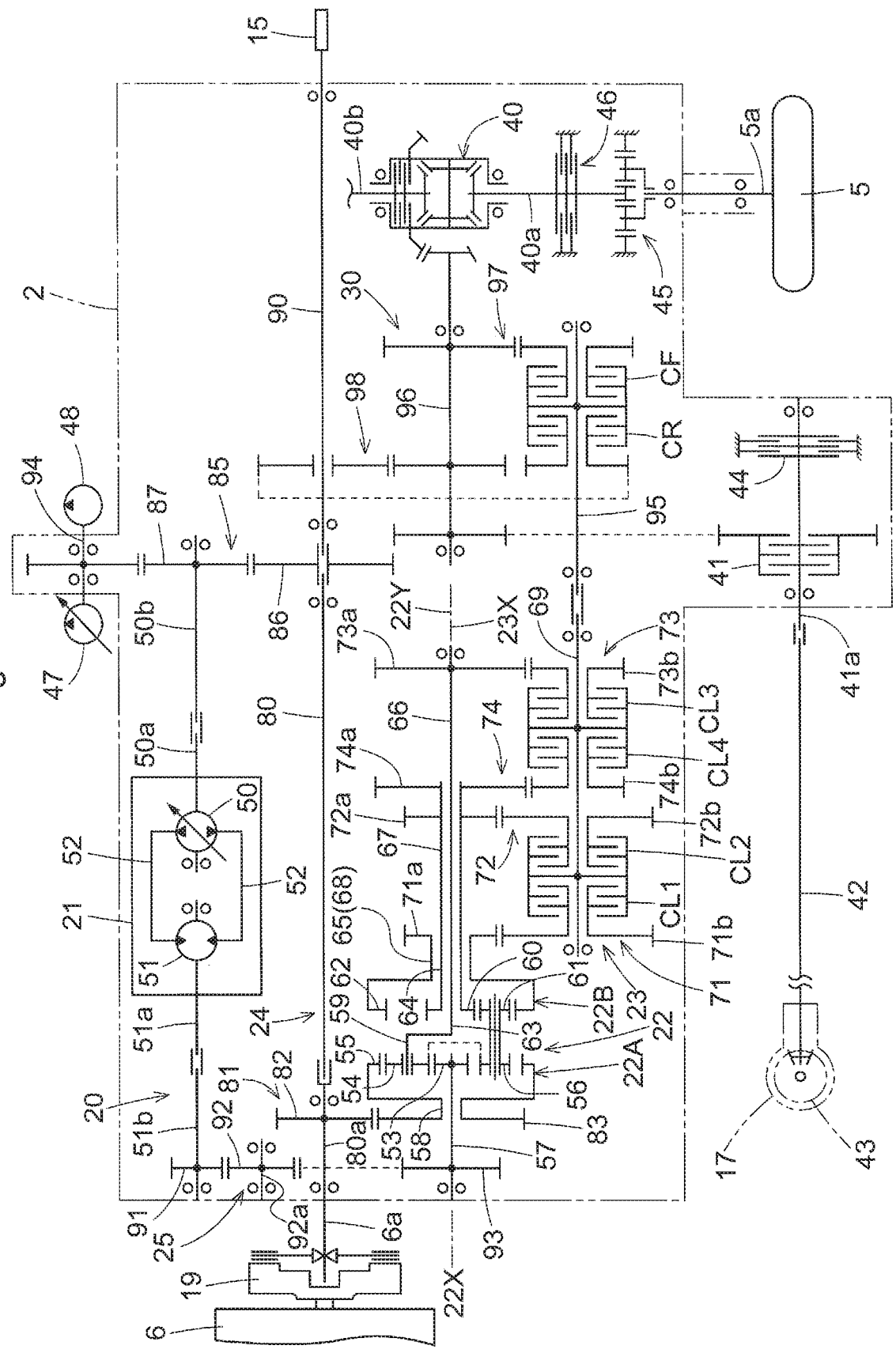
FIG. 2 is a line diagram illustrating a power transmission structure.

Motive power is transmitted from the engine 6 to the front wheels 4 and the rear wheels 5 based on the power transmission structure shown in FIG. 2.

That is, an output shaft 6a is provided in the rear portion of the engine 6 by extending it in the front-rear direction of the travel vehicle body 1. The output shaft 6a is interlockingly joined to a crank shaft of the engine 6 via a main clutch 19. Motive power of the output shaft 6a is input to the shift power transmission apparatus 20 and subjected to speed change in a state where the rotational speed is steplessly changed. The speed-changed motive power is input to the forward/reverse switching apparatus 30 and converted into forward travel motive power or reverse travel motive power. The forward travel motive power or reverse travel motive power that is output from the forward/reverse switching apparatus 30 is input to a rear wheel differential mechanism 40 and transmitted from the rear wheel differential mechanism 40 to the right/left rear wheels 5. The forward travel motive power or reverse travel motive power output from the forward/reverse switching apparatus 30 is input to a front wheel clutch 41, input to a front wheel differential mechanism 43 from an output shaft 41a of the front wheel clutch 41, which is a front-wheel power take-off shaft, via a rotary shaft 42, and transmitted from the front wheel differential mechanism 43 to the right/left front wheels 4. The front wheel differential mechanism 43 is provided inside the front wheel drive case 17.

When the front wheel clutch 41 is switched to an off state, transmission of motive power to the front wheel differential mechanism 43 is cut off and a two-wheel driving state in which only the right/left rear wheels 5 are driven out of the right/left front wheels 4 and the right/left rear wheels 5 is achieved. When the front wheel clutch 41 is switched to an on state, transmission of motive power to the front wheel differential mechanism 43 is enabled and a four-wheel driving state in which the right/left front wheels 4 and the right/left rear wheels 5 are driven is achieved. A parking brake 44 is provided on the output shaft 41a of the front wheel clutch 41.

A final decelerating mechanism 45 for the rear left wheel is provided between a left output shaft 40a of the rear wheel differential mechanism 40 and a rear left axle 5a. A steering brake 46 for braking the rear left wheel 5 is provided on the left output shaft 40a. A final decelerating mechanism for the rear right wheel 5 that has the same configuration as the final decelerating mechanism 45 for the rear left wheel and a steering brake for the rear right wheel 5 that has the same configuration as the steering brake for the rear left wheel are provided on a power transmission path from a right output shaft 40b of the rear wheel differential mechanism 40 to the rear right wheel 5.

A variable displacement type hydraulic pump 47 and a fixed displacement type hydraulic pump 48 shown in FIG. 2 are provided for taking hydraulic oil out of the travel vehicle body 1.

Shift Power Transmission Apparatus

As shown in FIG. 2, the shift power transmission apparatus 20 is provided inside the transmission case 2. The shift power transmission apparatus 20 includes a continuously variable (stepless) transmission unit 21, a combined planetary power transmission unit 22, and a shift output unit 23. A power transmission unit 24 is joined to the continuously variable transmission unit 21 and the combined planetary power transmission unit 22. A second planetary transmission unit 25 is joined to the combined planetary power transmission unit 22. The continuously variable transmission unit 21, the combined planetary power transmission unit 22, and the shift output unit 23 are provided in a state where the continuously variable transmission unit 21 is located at the same position as both the combined planetary power transmission unit 22 and the shift output unit 23 in the vehicle front-rear direction.

As shown in FIG. 2, the continuously variable transmission unit 21 includes a hydraulic pump 50 and a hydraulic motor 51. The hydraulic pump 50 and the hydraulic motor 51 are provided in a state where a pump shaft 50a of the hydraulic pump 50 is located further toward the vehicle rear side than a motor shaft 51a of the hydraulic motor 51 is. The pump shaft 50a protrudes from the hydraulic pump 50 toward the rear of the vehicle body and extends in a direction along the vehicle front-rear direction. The motor shaft 51a protrudes from the hydraulic motor 51 toward the front of the vehicle body and extends in a direction along the vehicle front-rear direction. The pump shaft 50a and the motor shaft 51a are aligned in a straight line. The hydraulic pump 50 is constituted by a variable displacement type hydraulic pump. The hydraulic pump 50 and the hydraulic motor 51 are connected via a pair of drive circuits 52.

The continuously variable transmission unit 21 is configured as a hydrostatic continuously variable transmission unit. In the continuously variable transmission unit 21, as a result of the swashplate angle of the hydraulic pump 50 being changed from a neutral angle to a forward rotation side, the hydraulic pump 50 is driven in a forward rotation direction, hydraulic oil is supplied from the hydraulic pump 50 to the hydraulic motor 51 via one of the drive circuits 52, and the hydraulic motor 51 is driven in a forward rotation direction. As a result of the swashplate angle of the hydraulic pump 50 being changed from the neutral angle to a reverse rotation side, the hydraulic pump 50 is driven in a reverse rotation direction, the hydraulic oil is supplied from the hydraulic pump 50 to the hydraulic motor 51 via the other drive circuit 52, and the hydraulic motor 51 is driven in a reverse rotation direction. Irrespective of whether the swashplate angle is changed from the neutral angle to the forward rotation side or the reverse rotation side, as the amount of change in the swashplate angle from the neutral angle increases, the more oil is discharged from the hydraulic pump 50, and the hydraulic motor 51 is driven at a higher speed.

Figure 3:
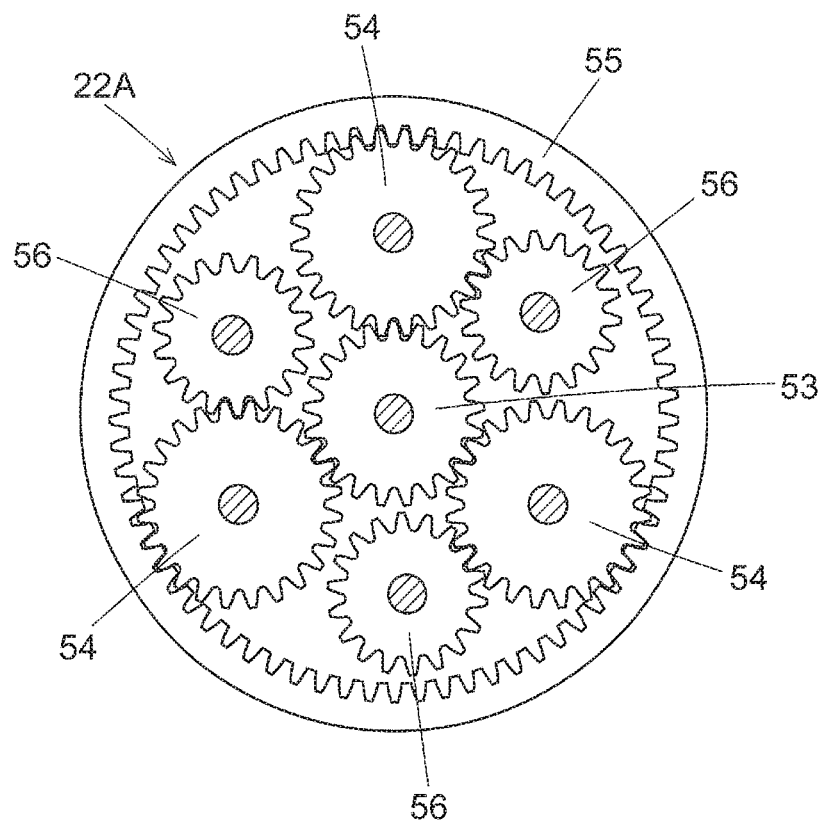
FIG. 3 is a view in section illustrating a planetary gear mechanism of a first row.
Figure 4:
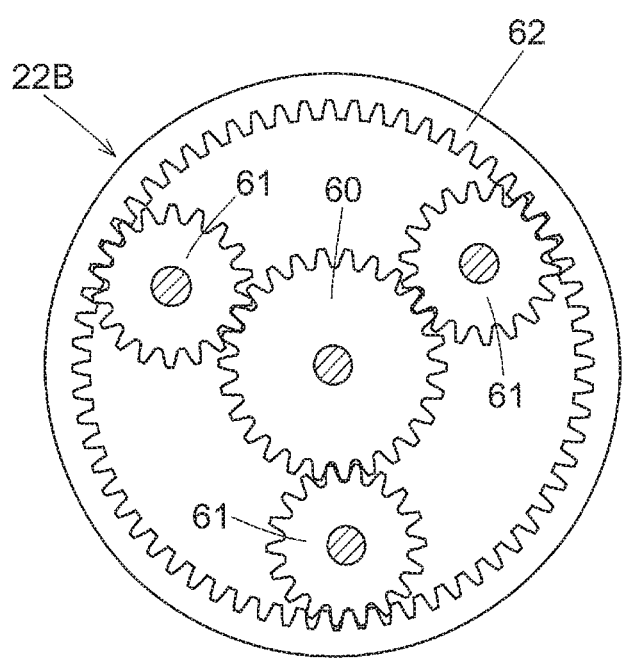
FIG. 4 is a view in section illustrating a planetary gear mechanism of a second row.

As shown in FIG. 2, the combined planetary power transmission unit 22 includes planetary gear mechanisms 22A and 22B arranged in two rows. As shown in FIGS. 2 and 3, the planetary gear mechanism 22A in the first row includes a sun gear 53, three planetary gears 54 and an internal gear 55. As shown in FIGS. 2 and 4, the planetary gear mechanism 22B in the second row includes a sun gear 60, three planetary gears 61 and an internal gear 62. As shown in FIGS. 2, 3 and 4, the planetary gear mechanism 22A in the first row includes three interlocking gears 56 that respectively mesh with the three planetary gears 54. The three interlocking gears 56 are respectively interlockingly joined to the three planetary gears 61 of the planetary gear mechanism 22B in the second row, and the three planetary gears 54 of the planetary gear mechanism 22A in the first row are respectively interlockingly joined to the three planetary gears 61 of the planetary gear mechanism 22B in the second row. The planetary gear mechanisms 22A and 22B in the two rows are configured as a combined planetary gear mechanism. In the present embodiment, the interlocking gears 56 and the planetary gears 61 are interlockingly joined by forming each interlocking gear 56 integrally with a corresponding planetary gear 61. The interlockingly joining means is not limited to integral formation of the interlocking gear 56 and the planetary gear 61, and various means can be employed such as a linkage shaft that is engaged with the interlocking gear 56 at one end and engaged with a planetary gear 61 at the other end.

As shown in FIG. 2, the combined planetary power transmission unit 22 includes a first input shaft 57 that is interlockingly joined to the sun gear 53 of the planetary gear mechanism 22A in the first row; and a second input shaft 58 that has the shape of a tube shaft, is interlockingly joined to the internal gear 55 of the planetary gear mechanism 22A in the first row, and fitted around the first input shaft 57.

The combined planetary power transmission unit 22 has a single planetary unit input axis 22X that is common to the first input shaft 57 and the second input shaft 58. The planetary unit input axis 22X extends in a direction along the vehicle front-rear direction. The planetary unit input axis 22X is an axis that is parallel to the motor shaft 51a and the pump shaft 50a.

As shown in FIG. 2, the combined planetary power transmission unit 22 includes a first output shaft 63 that is interlockingly joined to a planet carrier 59 of the planetary gear mechanism 22A in the first row; a second output shaft 64 that has the shape of a tube shaft, is interlockingly joined to the sun gear 60 of the planetary gear mechanism 22B in the second row, and fitted around the first output shaft 63; and a third output shaft 65 that has the shape of a tube shaft, is interlockingly joined to the internal gear 62 of the planetary gear mechanism 22B in the second row, and fitted around the second output shaft 64. The combined planetary power transmission unit 22 has a single planetary unit output axis 22Y that is common to the first output shaft 63, the second output shaft 64 and the third output shaft 65. The planetary unit output axis 22Y extends in a direction along the vehicle front-rear direction and is an axis that is parallel to the motor shaft 51a and the pump shaft 50a. The planetary unit output axis 22Y is coaxial with the planetary unit input axis 22X.

As shown in FIG. 2, the shift output unit 23 is located further toward the vehicle rear side than the combined planetary power transmission unit 22 is. The shift output unit 23 includes a first input shaft 66, a second input shaft 67, a third input shaft 68 and a shift output shaft 69. The first input shaft 66 is integrally formed with the first output shaft 63 of the combined planetary power transmission unit 22. The second input shaft 67 is integrally formed with the second output shaft 64 of the combined planetary power transmission unit 22. The third input shaft 68 is integrally formed with the third output shaft 65 of the combined planetary power transmission unit 22. The shift output unit 23 has a single shift unit input axis 23X that is common to the first input shaft 66, the second input shaft 67 and the third input shaft 68. The shift unit input axis 23X is coaxial with the planetary unit output axis 22Y and extends in a direction along the vehicle front-rear direction.

As shown in FIG. 2, a first gear range setting mechanism 71 is provided so as to span between the third input shaft 68 and the shift output shaft 69. The first gear range setting mechanism 71 includes a first input gear 71a that is provided on the third input shaft 68 so as not to be relatively rotatable; and a first shift gear 71b that is supported by the shift output shaft 69 so as to be relatively rotatable in a state of being meshed with the first input gear 71a. A first stage clutch CL1 is provided between the first shift gear 71b and the shift output shaft 69.

A second gear range setting mechanism 72 is provided so as to span between the second input shaft 67 and the shift output shaft 69. The second gear range setting mechanism 72 includes a second input gear 72a that is provided on the second input shaft 67 so as not to be relatively rotatable; and a second shift gear 72b that is supported by the shift output shaft 69 so as to be relatively rotatable in a state of being meshed with the second input gear 72a. A second stage clutch CL2 is provided between the second shift gear 72b and the shift output shaft 69.

A third gear range setting mechanism 73 is provided so as to span between the first input shaft 66 and the shift output shaft 69. The third gear range setting mechanism 73 includes a third input gear 73a that is supported by the first input shaft 66 so as not to be relatively rotatable; and a third shift gear 73b that is supported by the shift output shaft 69 so as to be relatively rotatable in a state of being meshed with the third input gear 73a. A third stage clutch CL3 is provided between the third shift gear 73b and the shift output shaft 69.

A fourth gear range setting mechanism 74 is provided so as to span between the second input shaft 67 and the shift output shaft 69. The fourth gear range setting mechanism 74 includes a fourth input gear 74a that is supported by the second input shaft 67 so as not to be relatively rotatable; and a fourth shift gear 74b that is supported by the shift output shaft 69 so as to be relatively rotatable in a state of being meshed with the fourth input gear 74a. A fourth stage clutch CL4 is provided between the fourth shift gear 74b and the shift output shaft 69.

Figures 6, 7:
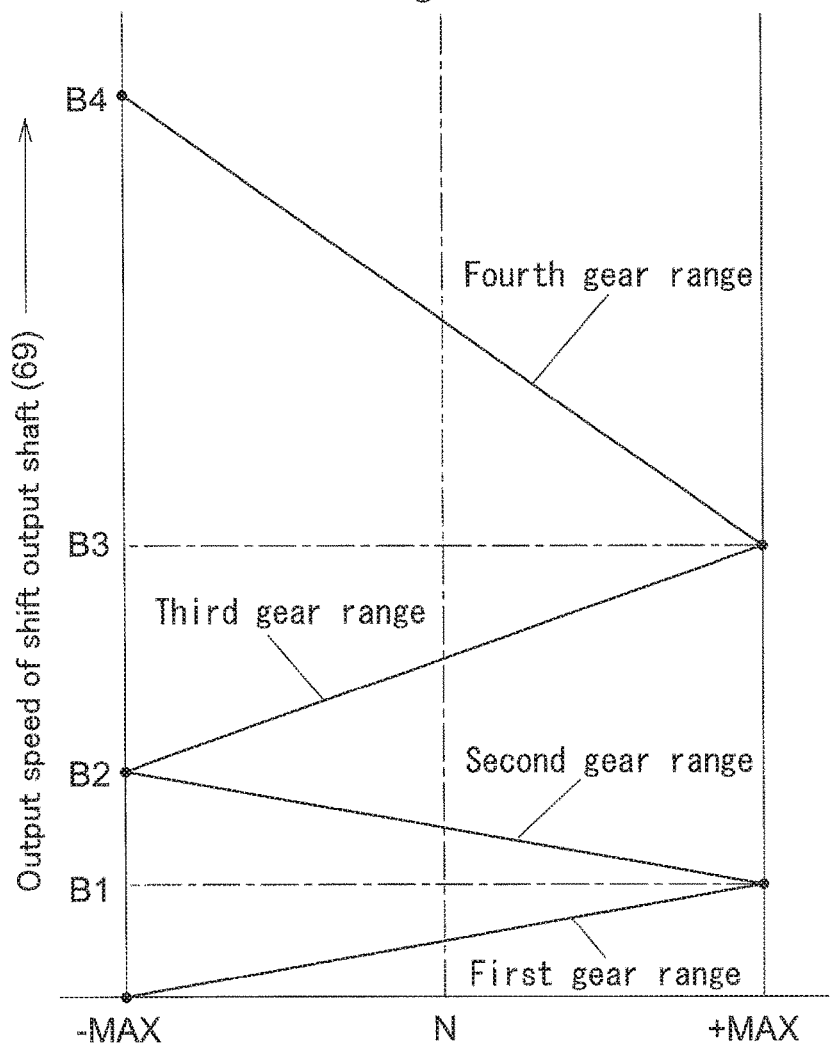
FIG. 6 is an illustrative diagram illustrating the relationship between the operation state of stage clutches and the speed range.
FIG. 7 is an illustrative diagram illustrating the relationship between the speed-change state of the continuously variable transmission unit, the speed range, and the output speed of a shift output shaft.

FIG. 6 is an illustrative diagram illustrating the relationship between the operation state of the first to fourth stage clutches CL1 to CL4 and the speed range. "ON" in FIG. 6 indicates the on state of the first to fourth stage clutches CL1 to CL4; and "-" (hyphen) indicates the off state of the first to fourth stage clutches CL1 to CL4.

As shown in FIG. 6, when the first stage clutch CL1 is switched to the on state and the second, third and fourth stage clutches CL2, CL3 and CL4 are switched to the off state, the shift output unit 23 is switched to a state where the first gear range is set. In the state where the first gear range is set, combined motive power that is input from the combined planetary power transmission unit 22 to the third input shaft 68 is transmitted to the shift output shaft 69 via the first input gear 71a, the first shift gear 71b and the first stage clutch CL1 as shown in FIG. 2, and is output from the shift output shaft 69 as motive power in the first gear range (see FIG. 7).

When the second stage clutch CL2 is switched to the on state and the first, third and fourth stage clutches CL1, CL3 and CL4 are switched to the off state, the shift output unit 23 is switched to a state where the second gear range is set. In the state where the second gear range is set, combined motive power that is input from the combined planetary power transmission unit 22 to the second input shaft 67 is transmitted to the shift output shaft 69 via the second input gear 72a, the second shift gear 72b and the second stage clutch CL2 as shown in FIG. 2, and is output from the shift output shaft 69 as motive power in the second gear range (see FIG. 7).

When the third stage clutch CL3 is switched to the on state and the first, second and fourth stage clutches CL1, CL2 and CL4 are switched to the off state, the shift output unit 23 is switched to a state where the third gear range is set. In the state where the third gear range is set, combined motive power that is input from the combined planetary power transmission unit 22 to the first input shaft 66 is transmitted to the shift output shaft 69 via the third input gear 73a, the third shift gear 73b and the third stage clutch CL3 as shown in FIG. 2, and is output from the shift output shaft 69 as motive power in the third gear range (see FIG. 7).

When the fourth stage clutch CL4 is switched to the on state and the first, second, and third stage clutches CL1, CL2 and CL3 are switched to the off state, the shift output unit 23 is switched to a state where the fourth gear range is set. In the state where the fourth gear range is set, combined motive power that is input from the combined planetary power transmission unit 22 to the second input shaft 67 is transmitted to the shift output shaft 69 via the fourth input gear 74a, the fourth shift gear 74b, and the fourth stage clutch CL4 as shown in FIG. 2 and is output from the shift output shaft 69 as motive power in the fourth gear range.

As shown in FIG. 2, the power transmission unit 24 includes a rotary power transmission shaft 80 that is located further toward the vehicle rear side than the engine 6 is, a planetary transmission unit 81 that is joined to the rotary power transmission shaft 80 at one end, and a pump transmission unit 85 that is joined to the rotary power transmission shaft 80 at one end.

The rotary power transmission shaft 80 is provided in a state of extending in the vehicle front-rear direction and being parallel to the pump shaft 50a and the motor shaft 51a. A power transmission shaft portion that is integrally formed with the output shaft 6a of the engine 6 is provided in a front end portion 80a of the rotary power transmission shaft 80, and the rotary power transmission shaft 80 is interlockingly joined to the output shaft 6a of the engine 6. The means for interlockingly joining the rotary power transmission shaft 80 and the output shaft 6a is not limited to integral formation of the rotary power transmission shaft 80 and the output shaft 6a, and the rotary power transmission shaft 80 and the output shaft 6a may be interlockingly joined using a joint. The rotary power transmission shaft 80 is interlockingly joined to the power take-off shaft 15 via a relay shaft 90 and has a power transmission function of transmitting motive power of the engine 6 to the power take-off shaft 15.

As shown in FIG. 2, the pump transmission unit 85 is located further toward the vehicle rear side than the shift output unit 23 is. The pump transmission unit 85 is provided so as to span between the rotary power transmission shaft 80 and an extension shaft portion 50b of the pump shaft 50a. The pump transmission unit 85 includes a motive power take-off gear 86 that is provided on the rotary power transmission shaft 80 so as not to be relatively rotatable; and a power transmission gear 87 that is provided on the extension shaft portion 50b so as not to be relatively rotatable in a state of being meshed with the motive power take-off gear 86. The outer diameter of the power transmission gear 87 is smaller than the outer diameter of the motive power take-off gear 86.

In the power transmission unit 24, motive power of the output shaft 6a of the engine 6 is transmitted by the rotary power transmission shaft 80 to the pump transmission unit 85, and input from the pump transmission unit 85 to the pump shaft 50a of the continuously variable transmission unit 21. Motive power of the rotary power transmission shaft 80 is input to the pump shaft 50a while being accelerated by the motive power take-off gear 86 and the power transmission gear 87, and thus the motive power of the output shaft 6a is input to the hydraulic pump 50 while being accelerated.

As shown in FIG. 2, the planetary transmission unit 81 is located further toward the vehicle front side than the combined planetary power transmission unit 22 is. The planetary transmission unit 81 is provided so as to span between the rotary power transmission shaft 80 and the second input shaft 58 of the combined planetary power transmission unit 22. The planetary transmission unit 81 includes a motive power take-off gear 82 that is provided on the rotary power transmission shaft 80 so as not to be relatively rotatable; and a power transmission gear 83 that is joined to the second input shaft 58 so as not to be relatively rotatable in a state of being meshed with the motive power take-off gear 82.

In the power transmission unit 24, motive power of the output shaft 6a of the engine 6 is transmitted from the rotary power transmission shaft 80 to the planetary transmission unit 81, and input from the planetary transmission unit 81 to the internal gear 55 of the planetary gear mechanism 22A in the first row of the combined planetary power transmission unit 22.

As shown in FIG. 2, the second planetary transmission unit 25 is provided so as to span between an extension shaft portion 51b of the motor shaft 51a and the first input shaft 57 of the combined planetary power transmission unit 22. The second planetary transmission unit 25 includes an output gear 91 that is provided on the extension shaft portion 51b so as not to be relatively rotatable, a relay gear 92 that is meshed with the output gear 91, and a power transmission gear 93 that is provided on the first input shaft 57 so as not to be relatively rotatable in a state of being meshed with the relay gear 92. The outer diameter of the relay gear 92 is larger than the outer diameter of the output gear 91. The outer diameter of the power transmission gear 93 is larger than the outer diameter of the relay gear 92.

In the second planetary transmission unit 25, motive power of the motor shaft 51a of the continuously variable transmission unit 21 is transmitted to the sun gear 53 of the planetary gear mechanism 22A in the first row of the combined planetary power transmission unit 22 while being decelerated by the output gear 91, the relay gear 92 and the power transmission gear 93.

Figure 5:
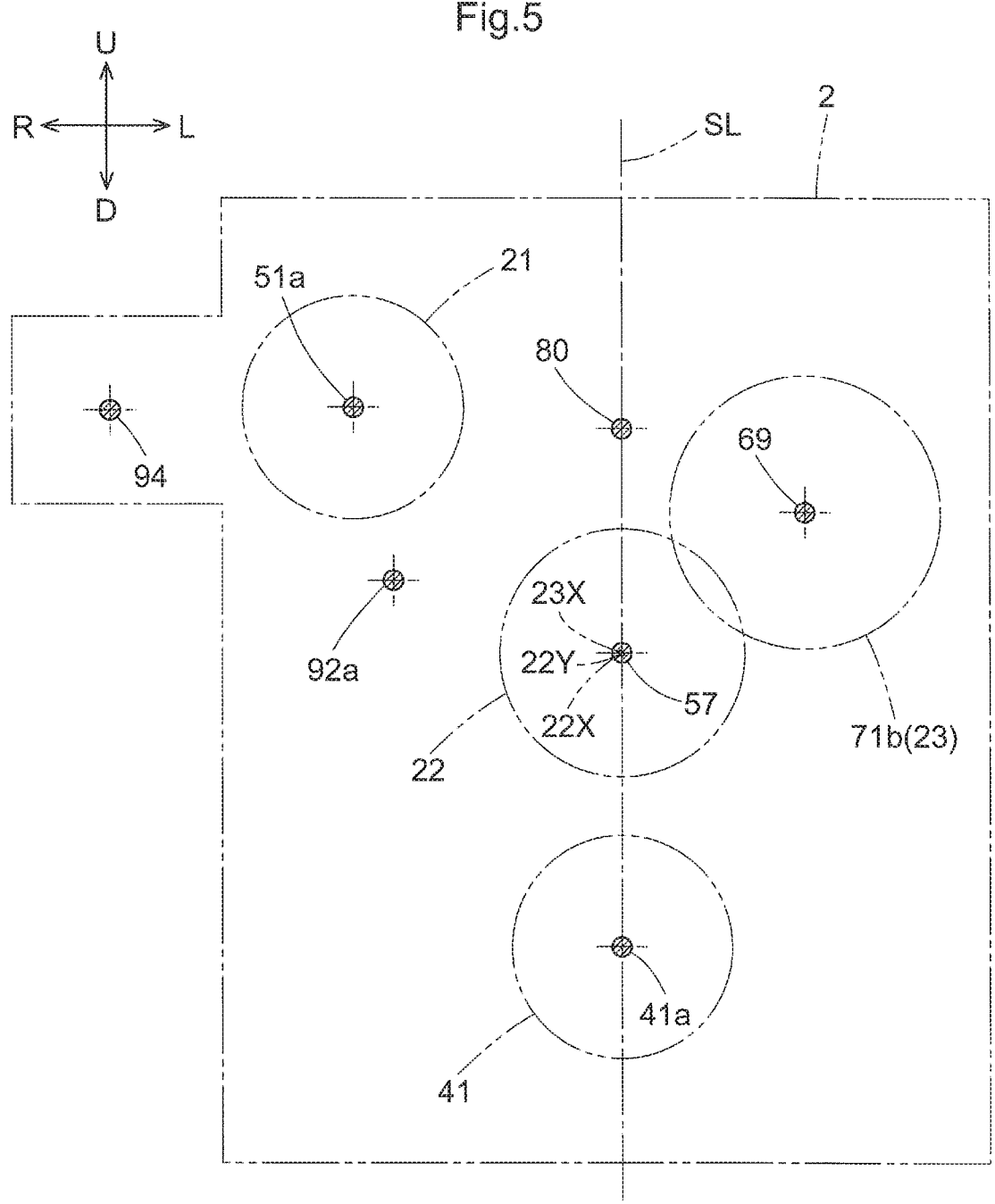
FIG. 5 is a front view illustrating a continuously variable transmission unit, a combined planetary power transmission unit, a shift output unit and a rotary power transmission shaft.

FIG. 5 is a front view illustrating the continuously variable transmission unit 21, the combined planetary power transmission unit 22, the shift output unit 23 and the rotary power transmission shaft 80. The direction indicated by 'L' in FIG. 5 is defined as a direction toward the left side of the travel vehicle body 1; the direction indicated by 'R' is defined as a direction toward the right side of the travel vehicle body 1; the direction indicated by IT is defined as a direction toward the upper side of the travel vehicle body 1; and the direction indicated by 'D' is defined as a direction toward the lower side of the travel vehicle body 1. A line SL in FIG. 5 indicates the center position of the travel vehicle body 1 in the right-left direction.

As shown in FIG. 5, the combined planetary power transmission unit 22 and the rotary power transmission shaft 80 are located in a central portion of the travel vehicle body 1 in the right-left direction. The rotary power transmission shaft 80 is located on the upper side of the combined planetary power transmission unit 22. As shown in FIGS. 2 and 5, the shift output shaft 69 of the shift output unit 23 is located on the upper left side of the shift unit input axis 23X. As shown in FIGS. 2 and 5, the continuously variable transmission unit 21 is located further toward the vehicle right side than the combined planetary power transmission unit 22 and the shift output unit 23 are. A support shaft 92a shown in FIG. 5 is a support shaft of the relay gear 92 in the second planetary transmission unit 25. In FIG. 5, reference numeral 94 indicates a drive shaft of the hydraulic pump 47 and the hydraulic pump 48 for taking out hydraulic oil.

In the shift power transmission apparatus 20, motive power of the output shaft 6a of the engine 6 is input to the hydraulic pump 50 of the continuously variable transmission unit 21 by the rotary power transmission shaft 80 and the pump transmission unit 85 in the power transmission unit 24 and, in the continuously variable transmission unit 21, subjected to stepless speed change as forward rotation motive power or reverse rotation motive power.

The motive power subjected to the speed change by the continuously variable transmission unit 21 is input by the second planetary transmission unit 25 to the sun gear 53 of the planetary gear mechanism 22A in the first row of the combined planetary power transmission unit 22. Motive power to be input from the engine 6 to the hydraulic pump 50 is accelerated by the pump transmission unit 85; and motive power to be input from the hydraulic motor 51 to the combined planetary power transmission unit 22 is decelerated by the second planetary transmission unit 25, and therefore motive power that is not affected or slightly affected by uneven rotation is output from the hydraulic motor 51 as a result of the hydraulic pump 50 being driven at a high speed, and motive power of an appropriate rotational speed that is not excessively high is input to the combined planetary power transmission unit 22.

Motive power of the engine 6 that is not subjected to speed change action by the continuously variable transmission unit 21 is input to the internal gear 55 of the planetary gear mechanism 22A in the first row of the combined planetary power transmission unit 22 by the rotary power transmission shaft 80 and the planetary transmission unit 81 in the power transmission unit 24.

Speed-changed motive power that is input from the continuously variable transmission unit 21 to the sun gear 53 and motive power that is input from the engine 6 to the internal gear 55 without being subjected to the speed change action by the continuously variable transmission unit 21 are combined by the planetary gear mechanisms 22A and 22B in the two rows of the combined planetary power transmission unit 22. The speed range of the combined motive power is divided into four stages by the shift output unit 23, and the combined motive power is output as motive power in any one of the first gear range, the second gear range, the third gear range and the fourth gear range.

As shown in FIG. 2, the forward/reverse switching apparatus 30 includes an input shaft 95; an output shaft 96; a forward travel power transmission mechanism 97 provided between the input shaft 95 and the output shaft 96; and a reverse travel power transmission mechanism 98 also provided between the input shaft 95 and the output shaft 96 to be located further toward the vehicle front side than the forward travel power transmission mechanism 97. A forward clutch CF is provided between the input shaft 95 and the forward travel power transmission mechanism 97. A reverse clutch CR is provided between the input shaft 95 and the reverse travel power transmission mechanism 98.

In operation of the forward/reverse switching apparatus 30, when the forward clutch CF is switched to the on state and the reverse clutch CR is switched to the off state, combined motive power input to the input shaft 95 is transmitted as forward travel motive power to the output shaft 96 via the forward clutch CF and the forward travel power transmission mechanism 97, and output from the output shaft 96 to the rear wheel differential mechanism 40 and the front wheel clutch 41. When the forward clutch CF is switched to the off state and the reverse clutch CR is switched to the on state, combined motive power input to the input shaft 95 is transmitted as reverse travel motive power to the output shaft 96 via the reverse clutch CR and the reverse travel power transmission mechanism 98, and output from the output shaft 96 to the rear wheel differential mechanism 40 and the front wheel clutch 41.

Figure 8:
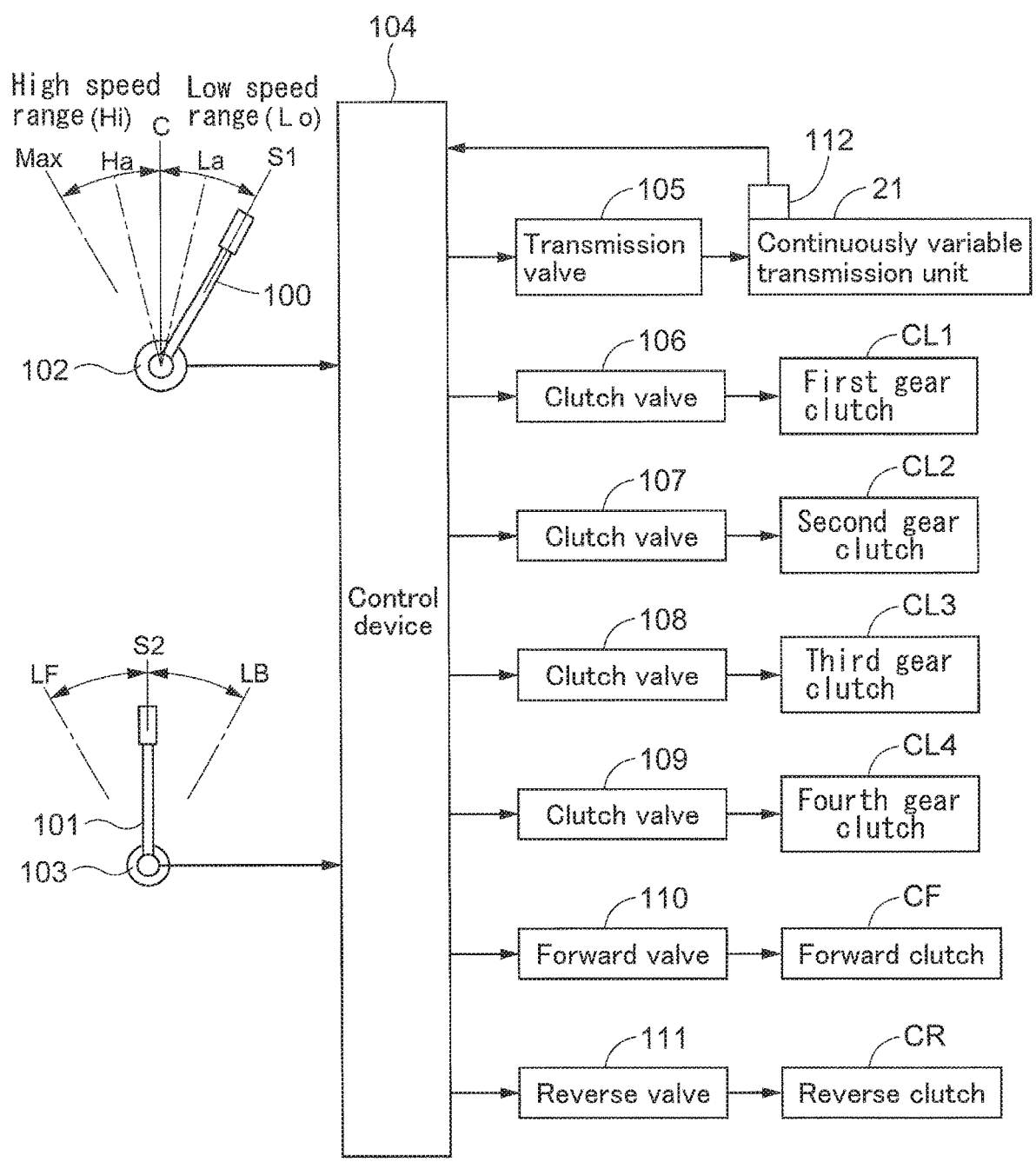
FIG. 8 is a block diagram illustrating a shift operation apparatus.

FIG. 8 is a block diagram of a travel operation apparatus included in the tractor. As shown in FIG. 8, the travel operation apparatus includes a shift lever 100, a forward/reverse lever 101, a shift detection device 102 that is interlocked with the shift lever 100, a forward/reverse detection device 103 that is interlocked with the forward/reverse lever 101, and a control device 104 that is linked to the forward/reverse detection device 103 and the shift detection device 102. The shift lever 100 and the forward/reverse lever 101 are provided in the driving unit 11.

The control device 104 is linked to an electromagnetic operation portion of a transmission valve 105 that performs a speed change operation on the continuously variable transmission unit 21 by changing the swashplate angle of the hydraulic pump 50, and also linked to respective electromagnetic operation portions of clutch valves 106 to 109 that respectively switch the first to fourth stage clutches CL1 to CL4. The control device 104 is linked to a electromagnetic operation portion of a forward valve 110 that switches the forward clutch CF, a electromagnetic operation portion of a reverse valve 111 that switches the reverse clutch CR, and a speed-change state detection device 112 that is provided in the continuously variable transmission unit 21.

The shift lever 100 is pivotable within an operation range from a neutral position S1 to a maximum speed position Max. In the operation range of the shift lever 100, the range from the neutral position S1 to a middle position C is a low speed range Lo that is mainly used during implement work operations; and the range from the middle position C to the maximum speed position Max is a high speed range Hi that is mainly used during travel. The forward/reverse lever 101 is switchable between a neutral position S2, a forward position LF and a reverse position LB.

The shift detection device 102 is constituted by a rotation potentiometer and interlocked with the shift lever 100. The operation position of the shift lever 100 is detected by the shift detection device 102 and the detection result is input to the control device 104. The forward/reverse detection device 103 is constituted by a rotation potentiometer and interlocked with the forward/reverse lever 101. The operation position of the forward/reverse lever 101 is detected by the forward/reverse detection device 103 and the detection result is input to the control device 104. The speed-change state detection device 112 detects the swashplate angle as the speed-change state of the continuously variable transmission unit 21 and feeds back the detection result to the control device 104.

The control device 104 is implemented using a microcomputer. Based on information regarding detection performed by the shift detection device 102 and the speed-change state detection device 112, the control device 104 controls the transmission valve 105 to perform the speed change operation on the continuously variable transmission unit 21 and controls the clutch valves 106 to 109 to switch the first to fourth stage clutches CL1 to CL4, and thus performs the speed change operation on the shift power transmission apparatus 20 such that output of a rotational speed that corresponds to the operation position of the shift lever 100 is obtained from the shift output shaft 69.

Based on information regarding detection performed by the forward/reverse detection device 103, the control device 104 controls the forward valve 110 to switch the forward clutch CF and controls the reverse valve 111 to switch the reverse clutch CR, and thus operates the forward/reverse switching apparatus 30 in an operation state that corresponds to the operation position of the forward/reverse lever 101.

That is, upon initiating travel of the tractor, the tractor travels in response to the shift lever 100 being pivoted from the neutral position S1, and as the operation stroke of the shift lever 100 from the neutral position S1 increases, the travel speed of the tractor increases and reaches the maximum speed when the shift lever 100 is pivoted to the maximum speed position Max.

FIG. 7 is an illustrative diagram illustrating the relationship between the speed-change state of the continuously variable transmission unit 21, the speed range, and the output speed of the shift output shaft 69. As shown in FIGS. 7 and 8, during the period from when the shift lever 100 is pivoted from the neutral position S1 to when it reaches a setting position La for the low speed range Lo (hereinafter referred to as a low speed setting position La), the control device 104 keeps the first gear clutch CL1 in the on state and the shift power transmission apparatus 20 performs the speed change operation while being kept in a state where it produces output in the first gear range. Also, as the shift lever 100 is pivoted from the neutral position S1, the control device 104 performs the speed change operation on the continuously variable transmission unit 21 from the speed-change state of the maximum speed "−MAX" of reverse rotation (hereinafter simply referred to as "−MAX") toward the speed-change state of the maximum speed "+MAX" of forward rotation (hereinafter simply referred to as "+MAX"). Therefore, the output rotational speed of the shift output shaft 69 steplessly increases from 0 as the shift lever 100 is operated from the neutral position S1. When the shift lever 100 reaches the low speed setting position La, the output rotational speed of the shift output shaft 69 becomes "B1". At this time, the control device 104 switches the first stage clutch CL1 to the off state and switches the second stage clutch CL2 to the on state, and thus the speed-change state is switched to a state where the shift power transmission apparatus 20 produces output in the second gear range.

Subsequently, during the period from when the shift lever 100 is pivoted from the low speed setting position La to when it reaches the middle position C, the control device 104 keeps the second stage clutch CL2 in the on state and the shift power transmission apparatus 20 performs the speed change operation while being kept in the state where it produces output in the second gear range. Also, as the shift lever 100 is pivoted from the low speed setting position La, the control device 104 performs the speed change operation on the continuously variable transmission unit 21 from the speed-change state of "+MAX" toward the speed-change state of "−MAX". Therefore, the output rotational speed of the shift output shaft 69 steplessly increases from "B1" as the shift lever 100 is pivoted from the low speed setting position La.

When the shift lever 100 reaches the middle position C, the output rotational speed of the shift output shaft 69 becomes "B2". At this time, the control device 104 switches the second stage clutch CL2 to the off state and switches the third stage clutch CL3 to the on state, and thus the speed-change state is switched to a state where the shift power transmission apparatus 20 produces output in the third gear range. Subsequently, during the period from when the shift lever 100 is pivoted from the middle position C to when it reaches a setting position Ha for the high speed range Hi (hereinafter referred to as a high speed setting position Ha), the control device 104 keeps the third stage clutch CL3 in the on state and the shift power transmission apparatus 20 performs the speed change operation while being kept in the state where it produces output in the third gear range. Also, as the shift lever 100 is pivoted from the middle position C, the control device 104 performs the speed change operation on the continuously variable transmission unit 21 from the speed-change state of "−MAX" toward the speed-change state of "+MAX". Therefore, the output rotational speed of the shift output shaft 69 steplessly increases from "B2" as the shift lever 100 is pivoted from the middle position C.

When the shift lever 100 reaches the high speed setting position Ha, the output rotational speed of the shift output shaft 69 becomes "B3". At this time, the control device 104 switches the third stage clutch CL3 to the off state and switches the fourth stage clutch CL4 to the on state, and thus the speed-change state is switched to a state where the shift power transmission apparatus 20 produces output in the fourth gear range. Subsequently, during the period from when the shift lever 100 is pivoted from the high speed setting position Ha to when it reaches the maximum speed position Max, the control device 104 keeps the fourth stage clutch CL4 in the on state and the shift power transmission apparatus 20 performs the speed change operation while being kept in the state where it produces output in the fourth gear range. Also, as the shift lever 100 is pivoted from the high speed setting position Ha, the control device 104 performs the speed change operation on the continuously variable transmission unit 21 from the speed-change state of "+MAX" toward the speed-change state of "−MAX". Therefore, the output rotational speed of the shift output shaft 69 steplessly increases from "B3" as the shift lever 100 is pivoted from the high speed setting position Ha.

At the time when the shift lever 100 reaches the maximum speed position Max, the control device 104 keeps the fourth stage clutch CL4 in the on state, and the speed-change state is the state where the shift power transmission apparatus 20 produces output in the fourth gear range. At this time, the control device 104 operates the continuously variable transmission unit 21 in the speed-change state of "−MAX". As a result, the output rotational speed of the shift output shaft 69 becomes "B4".

While the tractor is travelling as described above, the forward/reverse lever 101 is set at the forward position LF. In this case, the control device 104 switches the forward clutch CF to the on state and switches the reverse clutch CR to the off state. As a result, the forward/reverse switching apparatus 30 enters the forward travel state and motive power from the shift output shaft 69 is converted into forward travel motive power and transmitted to the rear wheel differential mechanism 40 and the front wheel differential mechanism 43, whereby the tractor travels forward. In contrast, in the case where the forward/reverse lever 101 is set at the reverse position LB, the control device 104 switches the forward clutch CF to the off state and switches the reverse clutch CR to the on state. As a result, the forward/reverse switching apparatus 30 enters the reverse travel state and motive power from the shift output shaft 69 is converted into reverse travel motive power and transmitted to the rear wheel differential mechanism 40 and the front wheel differential mechanism 43, whereby the tractor travels rearward.

Second Embodiment

A power transmission structure according to a second embodiment will be described next.

Configuration of Transmission Case

Figure 9:
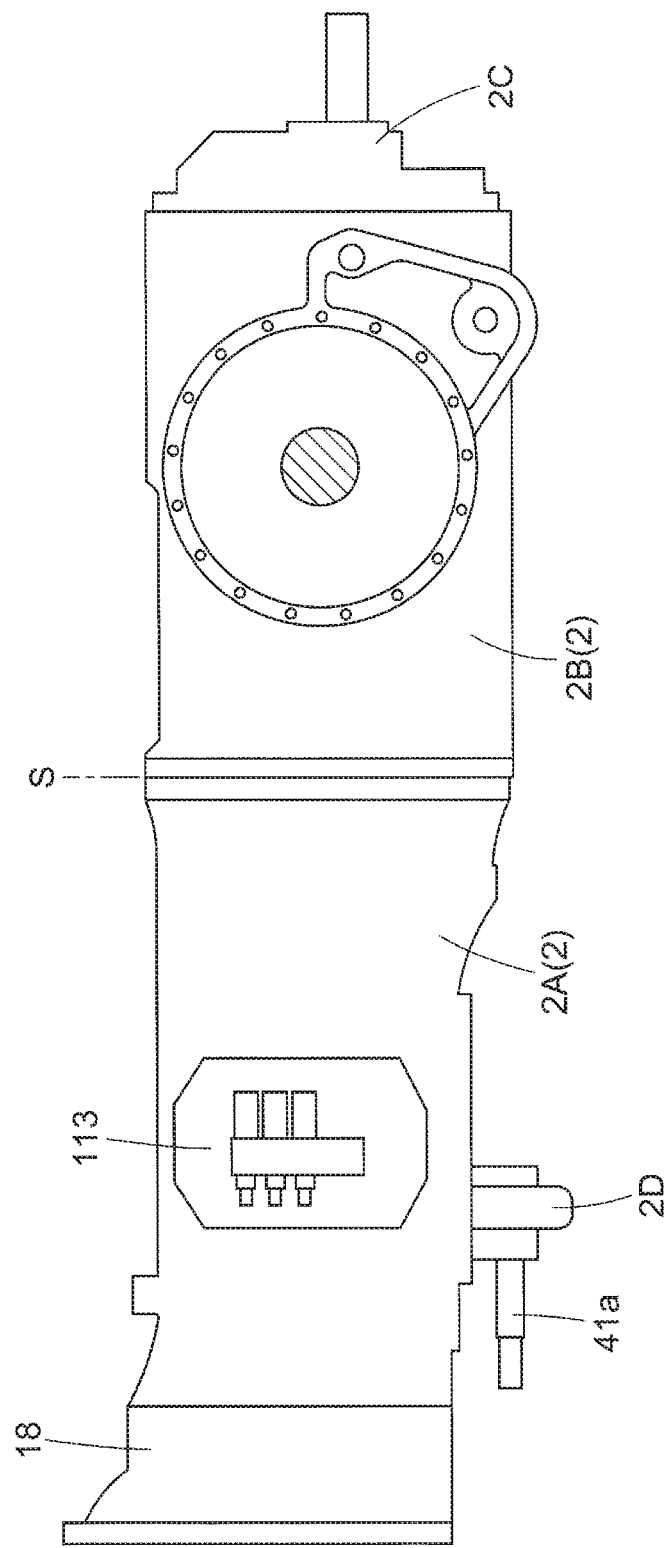
FIG. 9 is a side view illustrating a transmission case in a power transmission structure according to a second embodiment.
Figure 10:
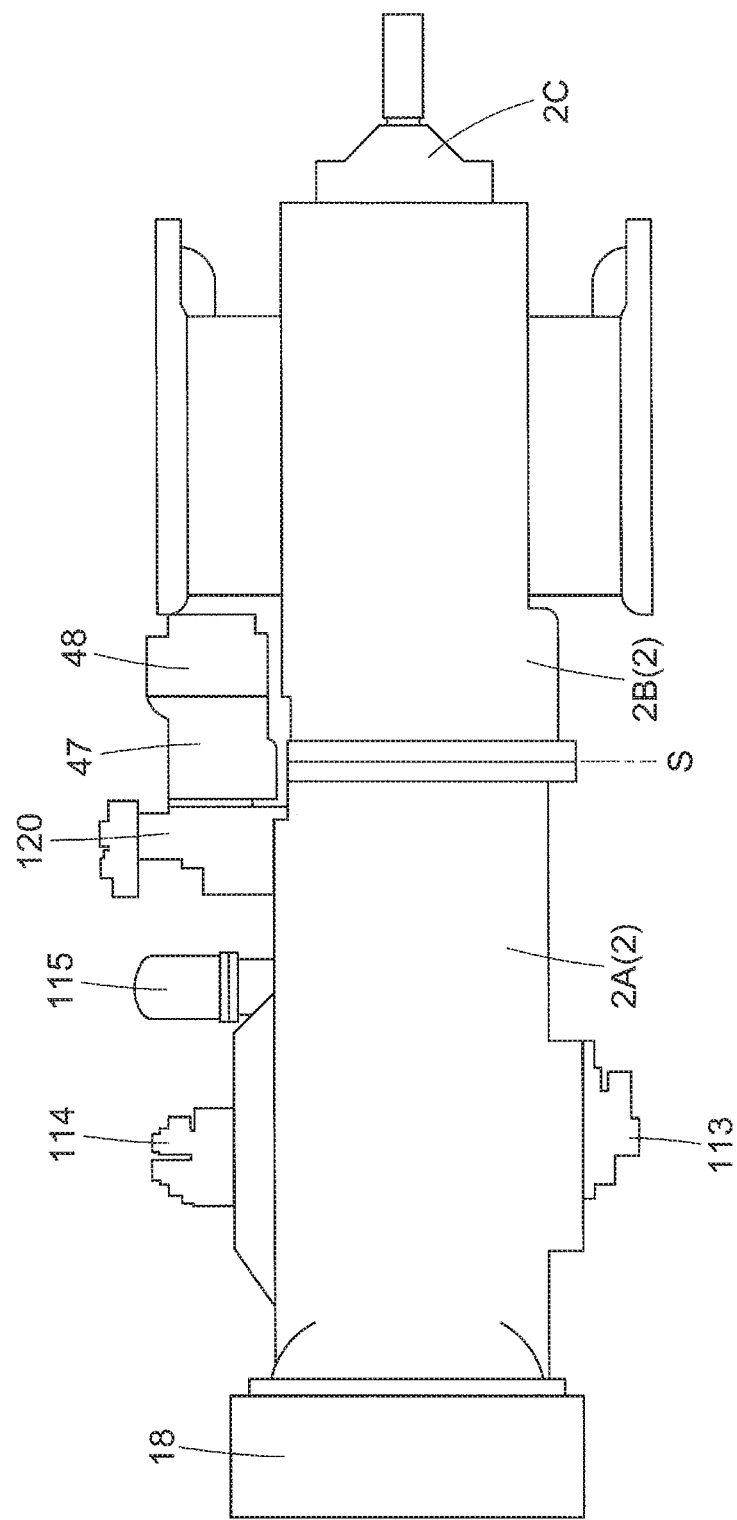
FIG. 10 is a plan view illustrating the transmission case in the power transmission structure according to the second embodiment.

As shown in FIGS. 9 and 10, in the power transmission structure including the other embodiment, the transmission case 2 includes a front case 2A that is joined, at its front portion, to a rear portion of the clutch housing 18; and a rear case 2B that is joined, at its front portion, to a rear portion of the front case 2A. The front case 2A is detachably joined to the clutch housing 18. The front case 2A and the rear case 2B are joined such that they can be separated at a joint position S. The transmission case 2 can be divided into the front case 2A and the rear case 2B. In a rear portion of the rear case 2B, a gear case 2C that also serves as a lid member for closing a rear opening of the rear case 2B is detachably provided.

The front case 2A is configured to house the continuously variable transmission unit 21, the combined planetary power transmission unit 22 and the shift output unit 23. The rear case 2B is configured to house the forward/reverse switching apparatus 30 and the rear wheel differential mechanism 40. As shown in FIG. 9, a front wheel output case portion 2D that is provided with the output shaft 41a of the front wheels 4 is provided in a lower portion of the front case 2A. As shown in FIGS. 9 and 10, a valve unit 113 that switches the first to fourth stage clutches CL1 to CL4 in the shift output unit 23 is provided on a left side wall portion of the front case 2A. As shown in FIG. 10, a valve unit 114 that performs a speed change operation on the continuously variable transmission unit 21 and an oil filter 115 that acts on hydraulic oil in the continuously variable transmission unit 21 are provided on a right side wall portion of the front case 2A. A power transmission case portion 120 that transmits motive power to the hydraulic pump 47 and the hydraulic pump 48 is provided on the right side wall portion of the front case 2A.

Figure 11:
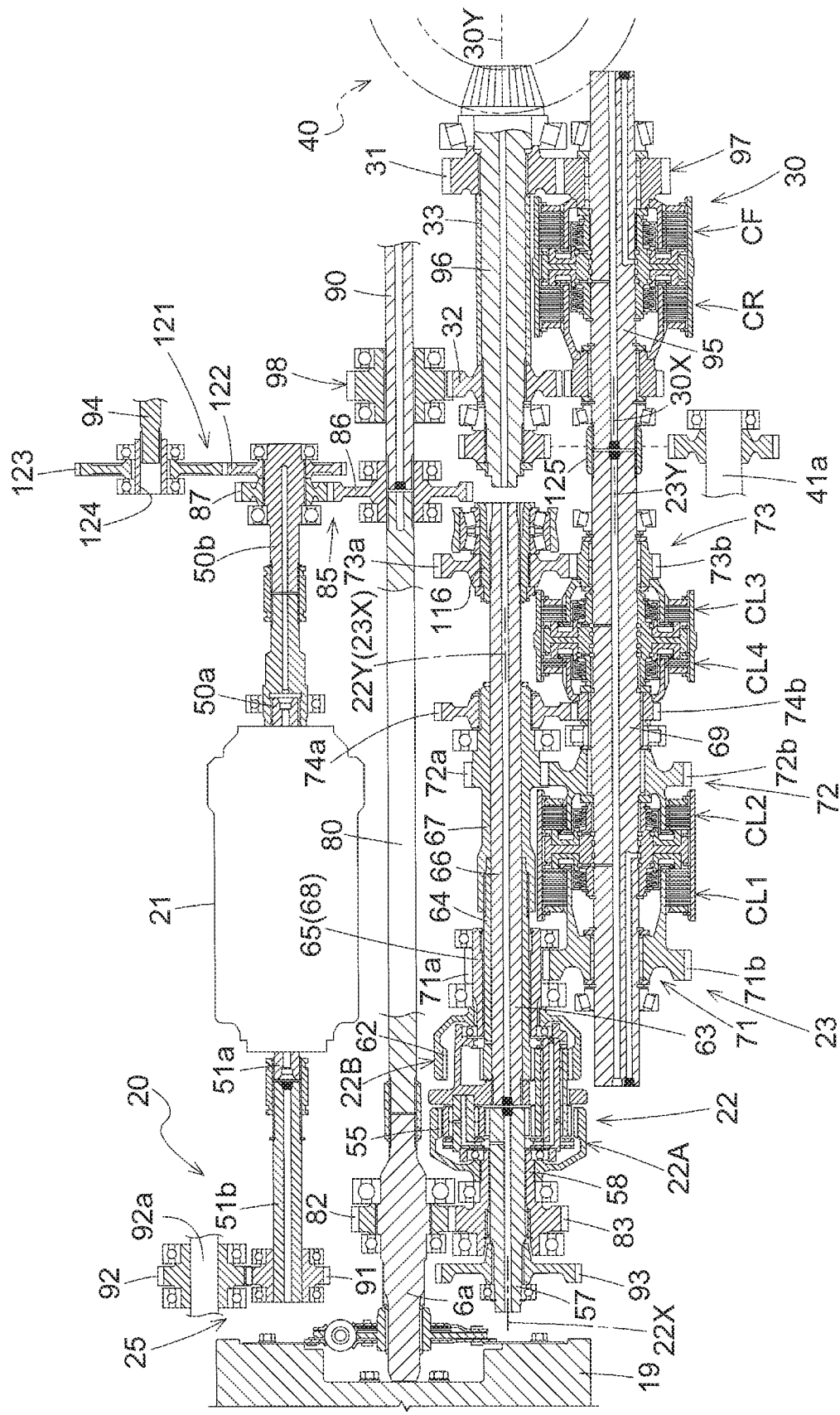
FIG. 11 is a developed view illustrating the power transmission structure according to the second embodiment.
Figure 12:
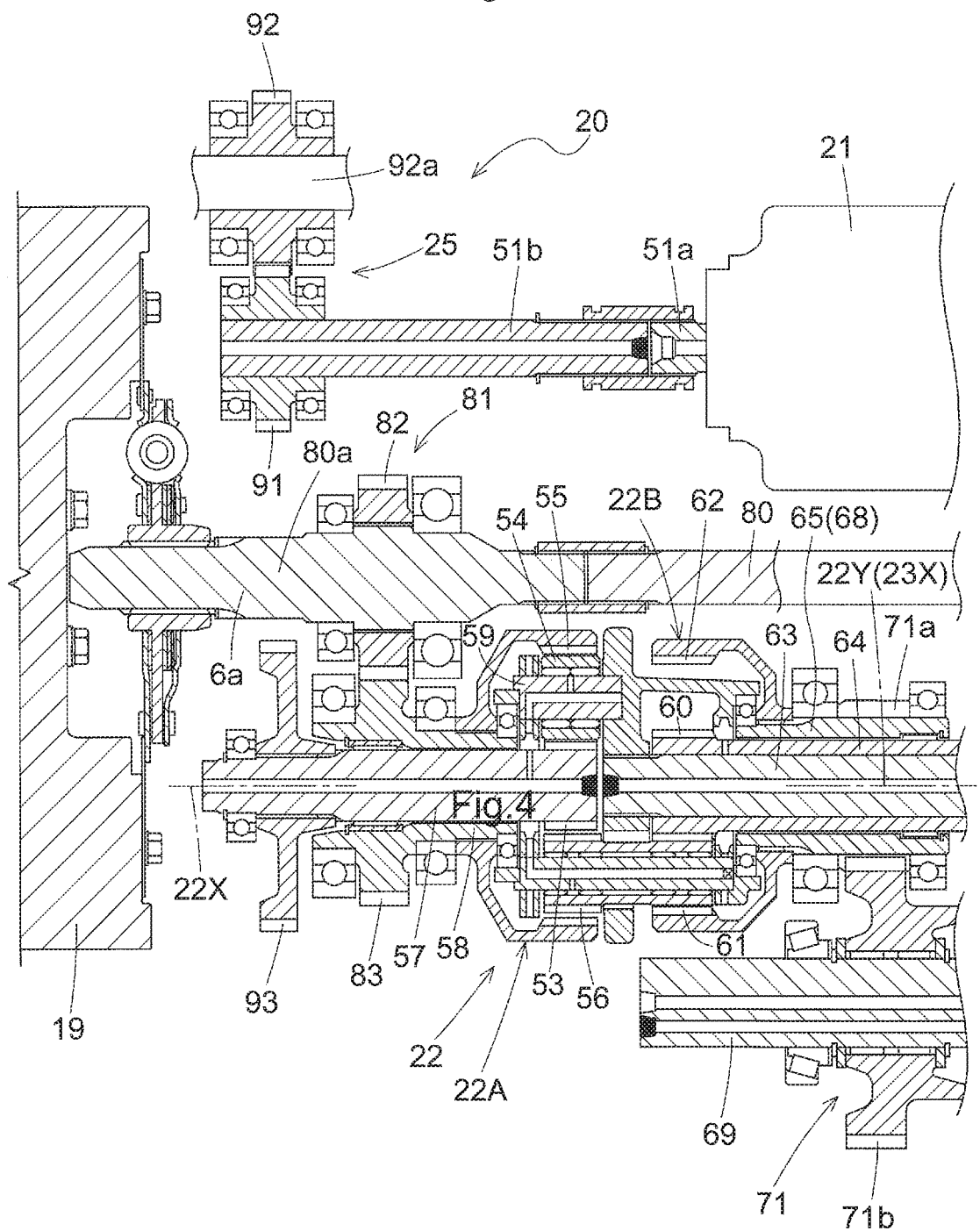
FIG. 12 is a view in section illustrating a combined planetary power transmission unit in the power transmission structure according to the second embodiment.

Configuration of Combined Planetary Power Transmission Unit and Shift Output Unit As shown in FIGS. 11 and 12, in the combined planetary power transmission unit 22, the second input shaft 58 and the internal gear 55 of the planetary gear mechanism 22A in the first row are interlockingly joined by engaging a boss portion of the internal gear 55 with a spline shaft portion that is formed in a rear portion of the second input shaft 58.

As shown in FIGS. 11 and 12, in the planetary gear mechanism 22B in the second row, the internal gear 62 and the third output shaft 65 are interlockingly joined by engaging a boss portion of the internal gear 62 with a spline shaft portion that is formed in a front portion of the third output shaft 65.

Figure 13:
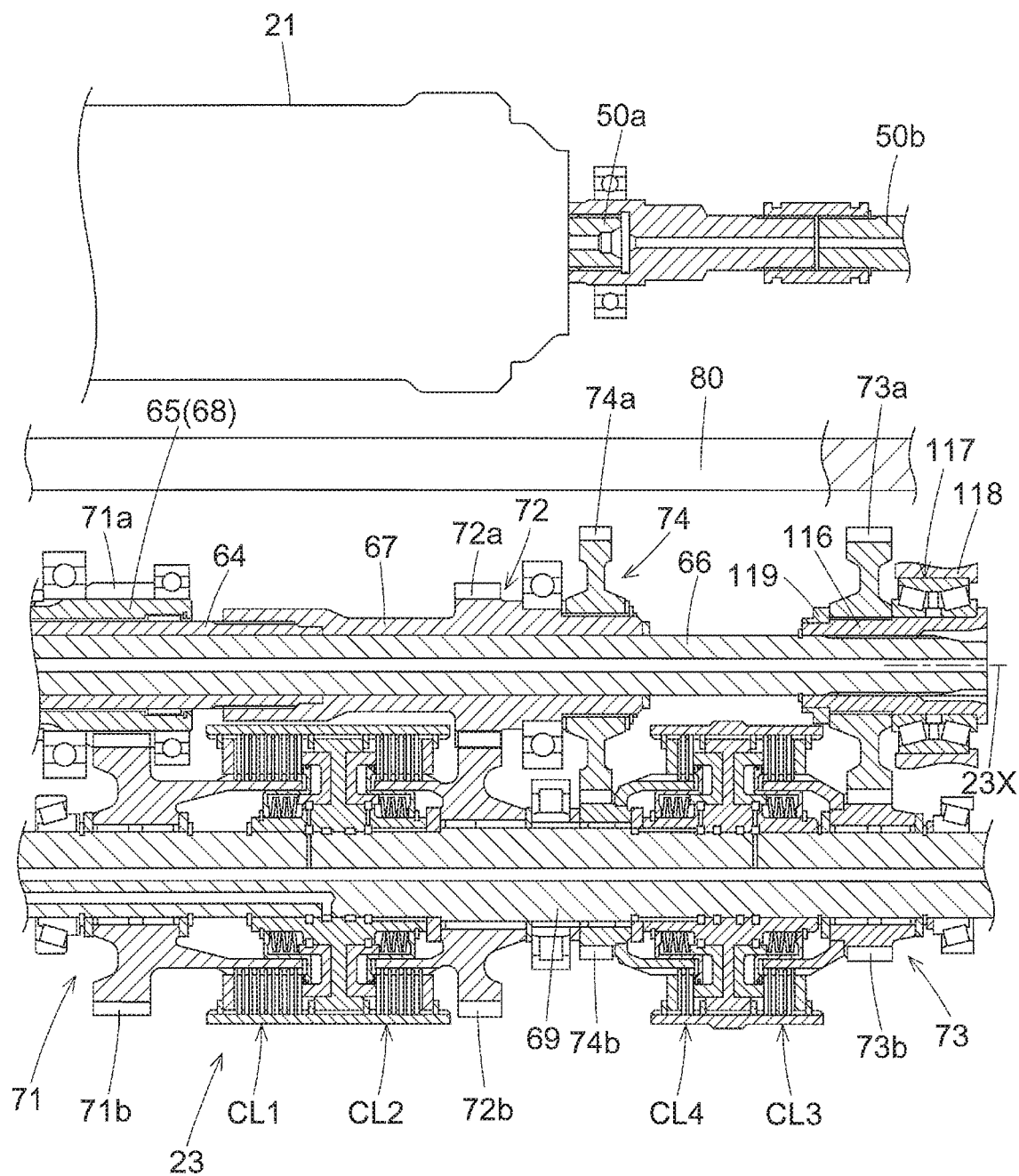
FIG. 13 is a view in section illustrating a shift output unit in the power transmission structure according to the second embodiment.

As shown in FIGS. 11 and 13, the second output shaft 64 of the planetary gear mechanism 22B in the second row and the second input shaft 67 of the shift output unit 23 are interlockingly joined by engaging a spline portion, that is formed in an outer circumferential portion of a rear end portion of the second output shaft 64, with a spline portion that is formed in an inner circumferential portion of a front end portion of the second input shaft 67.

As shown in FIGS. 11 and 13, in the shift output unit 23, the second input shaft 67 and the fourth input gear 74a are interlockingly joined by engaging a boss portion of the fourth input gear 74a with a spline portion that is formed in an outer circumferential portion of a rear portion of the second input shaft 67.

As shown in FIGS. 11 and 13, a rear end portion of the first input shaft 66 of the shift output unit 23 is rotatably supported by a wall portion 118 of the front case 2A via a tube support shaft 116 that is fitted to an outer circumferential portion of the first input shaft 66 and a bearing 117 that is fitted to an outer circumferential portion of the tube support shaft 116 in a rear portion thereof. A boss portion of the third input gear 73a is engaged with the outer circumferential portion of the tube support shaft 116 at a portion thereof that is located on the front side of the bearing 117. The third input gear 73a is supported by the first input shaft 66 via the tube support shaft 116. A boss portion of the third input gear 73a is engaged with the outer circumferential portion of the tube support shaft 116 through a spline structure, and an inner circumferential portion of the tube support shaft 116 is engaged with the outer circumferential portion of the first input shaft 66 through a spline structure. The third input gear 73a and the first input shaft 66 are interlockingly joined via the tube support shaft 116 so as not to be relatively rotatable.

Figure 15:
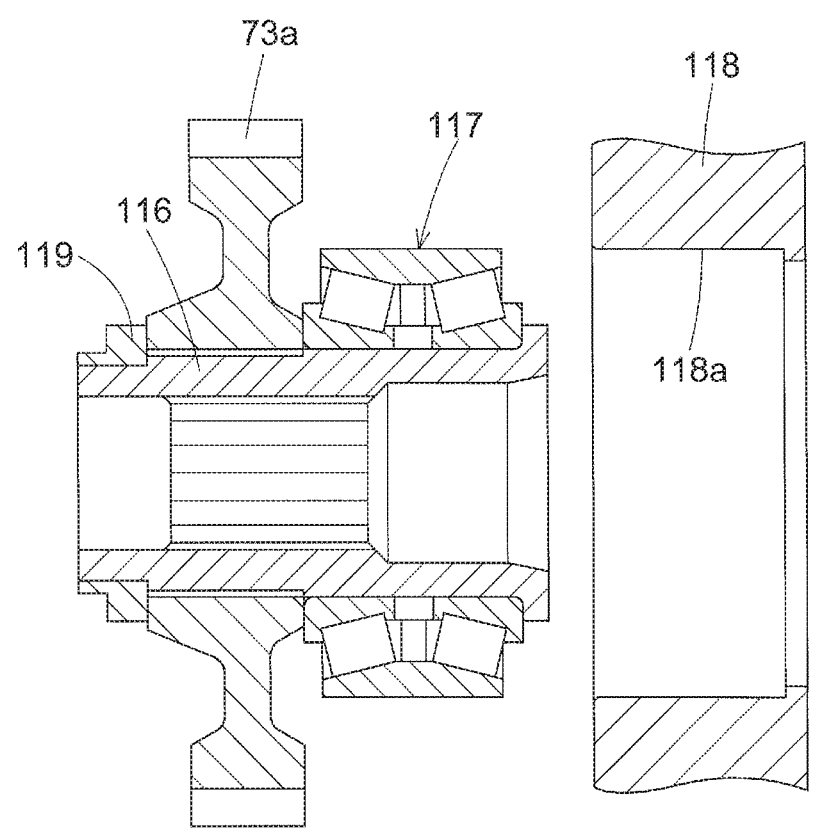
FIG. 15 is a view in section illustrating a support structure of a third input gear.

As shown in FIG. 15, in the support structure of the third input gear 73a, a stopper member 119 that keeps the third input gear 73a and the bearing 117 from coming loose is provided at an end portion of the tube support shaft 116 that is opposite to the end portion to which the bearing 117 is fitted. The third input gear 73a, the tube support shaft 116, the bearing 117 and the stopper member 119 constitute a unit. All of the third input gear 73a, the tube support shaft 116, the bearing 117 and the stopper member 119 can be attached to the first input shaft 66 at once by fitting the tube support shaft 116 in the spline shaft portion of the first input shaft 66 (see FIG. 13) from the rear side. By inserting the bearing 117 attached as described above into an attachment hole 118a (see FIG. 15) in the wall portion 118 from the front side, the first input shaft 66 can be supported by the wall portion 118.

Configuration of Hydraulic Pump

Figure 14:
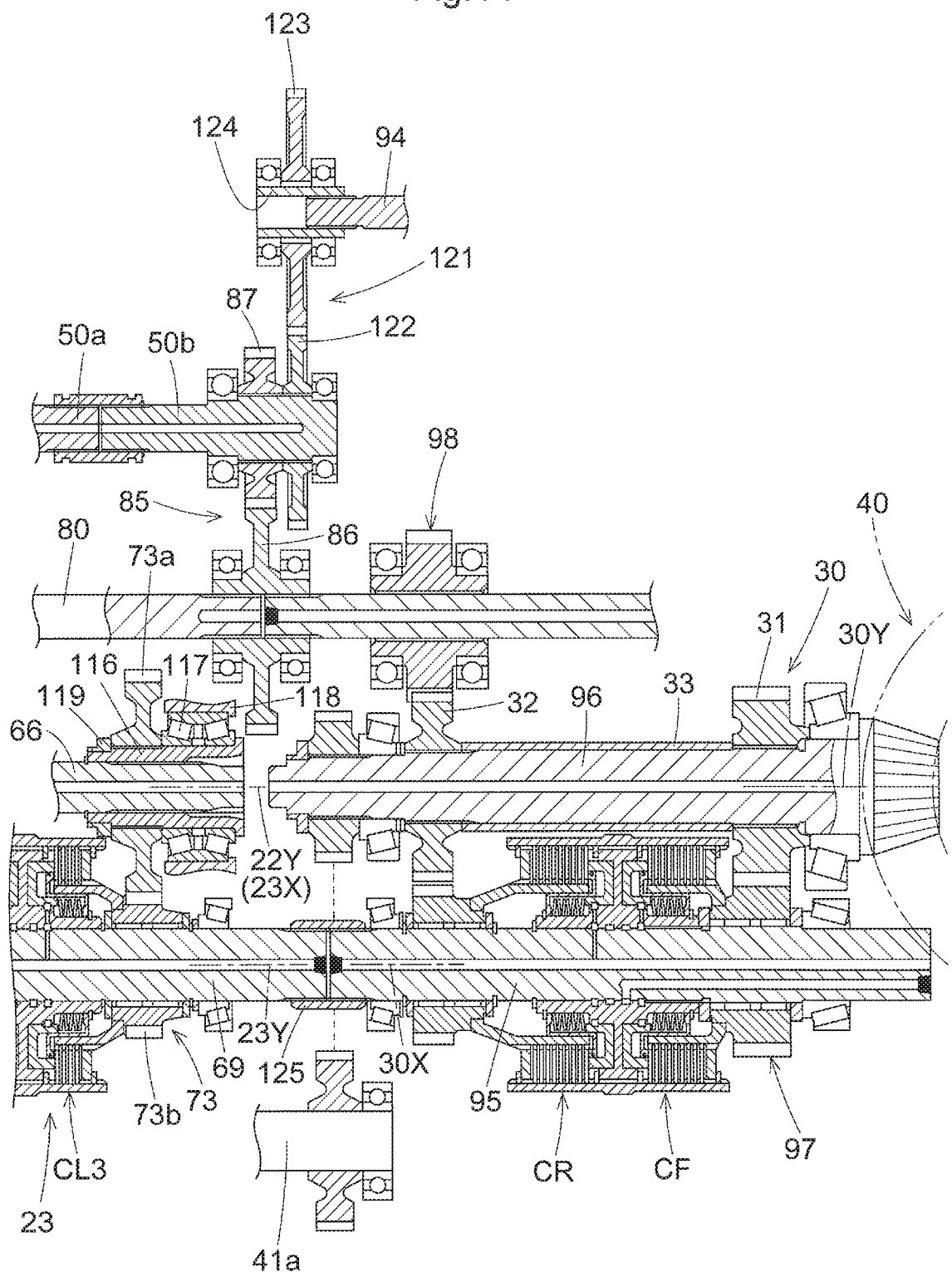
FIG. 14 is a view in section illustrating a forward/reverse switching apparatus in the power transmission structure according to the second embodiment.

As shown in FIG. 10, the hydraulic pump 47 and the hydraulic pump 48 are supported by the power transmission case portion 120 that protrudes from the right side wall portion of the front case 2A of the transmission case 2 to the outside of the transmission case. The hydraulic pump 47 and the hydraulic pump 48 are arranged in the front-rear direction on the rear side of the power transmission case portion 120. As shown in FIGS. 11 and 14, the extension shaft portion 50b and the drive shaft 94 of the hydraulic pump 47 and the hydraulic pump 48 are interlockingly joined by a pump driving mechanism 121. Motive power of the extension shaft portion 50b is transmitted by the pump driving mechanism 121 to the hydraulic pump 47 and the hydraulic pump 48. The pump driving mechanism 121 includes a motive power take-off gear 122 that is provided on the extension shaft portion 50b so as not to be relatively rotatable, a pump driving gear 123 that is meshed with the motive power take-off gear 122, and a joint member 124 that is fitted to the drive shaft 94 of the hydraulic pump 47 and the hydraulic pump 48 so as not to be relatively rotatable in a state of supporting the pump driving gear 123 so as not to be relatively rotatable.

Configuration of Forward/Reverse Switching Apparatus

As shown in FIGS. 11 and 14, the forward/reverse switching apparatus 30 is provided on the rear side of the shift output unit 23. The shift output unit 23 and the forward/reverse switching apparatus 30 are arranged in the front-rear direction in a state where the input shaft 95 of the forward/reverse switching apparatus 30 is located on the rear side of the shift output shaft 69 and the axis 30X of the input shaft 95 and the axis 23Y of the shift output shaft 69 are coaxial with each other. The input shaft 95 and the shift output shaft 69 are interlockingly joined by a joint member 125. A front portion of the joint member 125 is fitted to a spline shaft portion that is formed in a rear portion of the shift output shaft 69, and the spline shaft portion and the joint member 125 are engaged with each other. A rear portion of the joint member 125 is fitted to a spline shaft portion that is formed in a front portion of the input shaft 95, and the spline shaft portion and the joint member 125 are engaged with each other.

As shown in FIG. 11, the first input shaft 66, the second input shaft 67 and the third input shaft 68 of the shift output unit 23 are configured as triple shafts. The first input shaft 66, the second input shaft 67 and the third input shaft 68 have the common shift unit input axis 23X. As shown in FIGS. 11 and 14, the shift output unit 23 and the forward/reverse switching apparatus 30 are arranged in the front-rear direction in a state where the output shaft 96 of the forward/reverse switching apparatus 30 is located on the rear side of the first input shaft 66 and the axis 30Y of the output shaft 96 and the shift unit input axis 23X are coaxial with each other.

As shown in FIG. 14, a forward travel power transmission gear 31 that transmits output of the forward clutch CF to the output shaft 96 is engaged with a spline shaft portion that is formed in a rear portion of the output shaft 96, and joined to the output shaft 96 so as not to be relatively rotatable. A reverse travel power transmission gear 32 that transmits output of the reverse clutch CR to the output shaft 96 is engaged with a spline shaft portion that is formed in a front portion of the output shaft 96, and joined to the output shaft 96 so as not to be relatively rotatable. A spacer 33 that keeps the distance between the reverse travel power transmission gear 32 and the forward travel power transmission gear 31 at a set distance is attached to a portion of the output shaft 96 between the reverse travel power transmission gear 32 and the forward travel power transmission gear 31. The reverse travel power transmission gear 32 and the forward travel power transmission gear 31 are each positioned relative to the output shaft 96 by the spacer 33.

FIG. 16 is a front view illustrating arrangement of the continuously variable transmission unit 21, the combined planetary power transmission unit 22, the stage clutches of the shift output unit 23, the clutches of the forward/reverse switching apparatus 30, the rotary power transmission shaft 80 and the like. A vertical line T extending in the up-down direction in FIG. 16 indicates the center of the travel vehicle body 1 (see FIG. 1) in the right-left direction (hereinafter referred to as right-left center). A horizontal line Y extending in the right-left direction in FIG. 16 indicates the oil level of lubricating oil that is retained in the transmission case 2. As shown in FIG. 16, the rotary power transmission shaft 80, the first input shaft 57, the first output shaft 63 and the first input shaft 66 are located at the right-left center of the travel vehicle body 1. The first input shaft 57, the first output shaft 63 and the first input shaft 66 are located on the lower side of the rotary power transmission shaft 80. The shift output shaft 69 is located on the vehicle left side of the right-left center of the travel vehicle body 1. In the up-down direction of the travel vehicle body 1, the shift output shaft 69 is located at the same position (height) as a space between the rotary power transmission shaft 80 and the first input shaft 57. The motor shaft 51a and the support shaft 92a are located on the vehicle right side of the right-left center of the travel vehicle body 1. The support shaft 92a is located on the lower side of the motor shaft 51a. The drive shaft 94 of the hydraulic pump 47 and the hydraulic pump 48 is located further toward the vehicle right side than the motor shaft 51a is. The drive shaft 94 is located at the same height as the motor shaft 51a. The combined planetary power transmission unit 22 is located at the right-left center of the travel vehicle body 1. The first to fourth stage clutches CL1 to CL4, the forward clutch CF and the reverse clutch CR are located on the vehicle left side of the right-left center of the travel vehicle body 1. The continuously variable transmission unit 21 is located on the vehicle right side of the right-left center of the travel vehicle body 1.

Solution to fulfill the object may be configured as below:

(1) Although the above embodiments are described regarding the case where the speed can be changed across four stages of the speed range, it is possible to employ a configuration in which the speed can be changed across three or less stages or five or more stages of the speed range.

(2) Although the above embodiments are described regarding the case where the continuously variable transmission unit 21 is located at the same position as (overlapped or co-extending with) both the combined planetary power transmission unit 22 and the shift output unit 23 in the vehicle front-rear direction, it is possible to employ a configuration in which the continuously variable transmission unit 21 is located at the same position as only one of the combined planetary power transmission unit 22 and the shift output unit 23.

(3) Although the above embodiments are described regarding the case where the continuously variable transmission unit 21 is located further toward the vehicle right side than the combined planetary power transmission unit 22 and the shift output unit 23 are, the continuously variable transmission unit 21 may be located further toward the vehicle left side than the combined planetary power transmission unit 22 and the shift output unit 23 are, further toward the vehicle upper side than the combined planetary power transmission unit 22 and the shift output unit 23 are, or further toward the vehicle lower side than the combined planetary power transmission unit 22 and the shift output unit 23 are.

(4) Although the above embodiments are described regarding the case where motive power of the rotary power transmission shaft 80 is transmitted to the pump shaft 50a while being accelerated and motive power of the motor shaft 51a is transmitted to the combined planetary power transmission unit 22 while being decelerated, it is possible to employ a configuration in which motive power is transmitted without being accelerated or decelerated.

(5) Although the above embodiments are described regarding the case where the pump shaft 50a and the motor shaft 51a are aligned in a straight line such that the pump shaft 50a is located further toward the vehicle rear side than the motor shaft 51a is, it is possible to employ any other arrangements such as an arrangement in which the pump shaft 50a and the motor shaft 51a are aligned in the vehicle transverse direction or vehicle up-down direction.

(6) It is possible to provide travel apparatuses that are constituted by a combination of front wheels and a travel apparatus of a mini crawler instead of the front wheels and the rear wheels.

What is claimed is:

1. A shift power transmission apparatus of a tractor, the apparatus comprising:
  a hydrostatic continuously variable transmission unit that includes a hydraulic pump and a hydraulic motor, and is configured to receive motive power of an engine and output motive power of stepless rotational speed by changing a speed of the received motive power;
  a combined planetary power transmission unit that is configured to receive speed-changed output of the continuously variable transmission unit and motive power of the engine that is not subjected to speed change action by the continuously variable transmission unit, and combine the received speed-changed output and the motive power of the engine, and output combined motive power; and a shift output unit that includes a plurality of stage clutches and a shift output shaft that supports the plurality of stage clutches in a state of being arranged in a vehicle front-rear direction, the shift output unit being configured to receive the combined motive power from the combined planetary power transmission unit, and divide a speed range of the received combined motive power into a plurality of stages, and output the received combined motive power from the shift output shaft toward a travel apparatus, wherein the continuously variable transmission unit is provided in a state where the continuously variable transmission unit is located further toward a vehicle rear side than the engine, the continuously variable transmission unit having a motor shaft and a pump shaft that extend in the vehicle front-rear direction, wherein the combined planetary power transmission unit is provided in a state where the combined planetary power transmission unit is located further toward the vehicle rear side than the engine, the combined planetary power transmission unit having a single planetary unit input axis and a single planetary unit output axis, the planetary unit input axis extending in a direction along the vehicle front-rear direction and parallel to the motor shaft and the pump shaft, wherein the shift output unit is provided in a state where the shift output unit is located further toward the vehicle rear side than the combined planetary power transmission unit is, the shift output unit having a single shift unit input axis that extends coaxial with the planetary unit output axis, wherein the apparatus further comprises a power transmission unit that is configured to transmit the motive power of the engine to the continuously variable transmission unit and the combined planetary power transmission unit, the power transmission unit including a rotary power transmission shaft, a pump transmission unit and a planetary transmission unit, the rotary power transmission shaft being located further toward the vehicle rear side than the engine in a state of being interlockingly joined to an output shaft of the engine, the rotary power transmission shaft extending in a direction along the vehicle front-rear direction and parallel to the motor shaft and the pump shaft, the pump transmission unit being configured to input motive power of the rotary power transmission shaft to the pump shaft, and the planetary transmission unit being configured to input motive power of the rotary power transmission shaft to the combined planetary power transmission unit, wherein the continuously variable transmission unit is located at the same position as at least one of the combined planetary power transmission unit and the shift output unit in the vehicle front-rear direction, wherein the pump shaft is located further toward the vehicle rear side than the motor shaft, and wherein the pump transmission unit is located further toward the vehicle rear side than the shift output unit.

2. The shift power transmission apparatus of a tractor according to claim 1, wherein the pump transmission unit is configured to input the motive power of the rotary power transmission shaft to the pump shaft by accelerating the motive power, and wherein the apparatus further comprises a second planetary transmission unit that is configured to input motive power of the motor shaft to the combined planetary power transmission unit, the second planetary transmission unit being configured to input the motive power of the motor shaft by decelerating the motive power.

3. The shift power transmission apparatus of a tractor according to claim 2, wherein the planetary transmission unit is located further toward a vehicle front side than the combined planetary power transmission unit.

4. The shift power transmission apparatus of a tractor according to claim 2, wherein the apparatus further comprises a forward/reverse switching apparatus that is provided on a rear side of the shift output unit, the forward/reverse switching apparatus having an input shaft to which motive power that is output from the shift output shaft of the shift output unit is input, the forward/reverse switching apparatus being configured to output motive power of the input shaft to the travel apparatus by converting the motive power into forward travel motive power or reverse travel motive power, and wherein the shift output unit and the forward/reverse switching apparatus are arranged in the front-rear direction in a state where an axis of the input shaft and an axis of the shift output shaft are coaxial with each other.

5. The shift power transmission apparatus of a tractor according to claim 2, wherein the apparatus further comprises a forward/reverse switching apparatus that is provided on a rear side of the shift output unit, the forward/reverse switching apparatus being configured to receive motive power that is output from the shift output unit, and output the received motive power from an output shaft to the travel apparatus by converting the motive power into forward travel motive power or reverse travel motive power, and wherein the shift output unit and the forward/reverse switching apparatus are arranged in the front-rear direction in a state where a shift unit input axis of the shift output unit and an axis of the output shaft are coaxial with each other.

6. The shift power transmission apparatus of a tractor according to claim 1, wherein the planetary transmission unit is located further toward a vehicle front side than the combined planetary power transmission unit.

7. The shift power transmission apparatus of a tractor according to claim 6, wherein the apparatus further comprises a forward/reverse switching apparatus that is provided on a rear side of the shift output unit, the forward/reverse switching apparatus having an input shaft to which motive power that is output from the shift output shaft of the shift output unit is input, the forward/reverse switching apparatus being configured to output motive power of the input shaft to the travel apparatus by converting the motive power into forward travel motive power or reverse travel motive power, and wherein the shift output unit and the forward/reverse switching apparatus are arranged in the front-rear direction in a state where an axis of the input shaft and an axis of the shift output shaft are coaxial with each other.

8. The shift power transmission apparatus of a tractor according to claim 6, wherein the apparatus further comprises a forward/reverse switching apparatus that is provided on a rear side of the shift output unit, the forward/reverse switching apparatus being configured to receive motive power that is output from the shift output unit, and output the received motive power from an output shaft to the travel apparatus by converting the motive power into forward travel motive power or reverse travel motive power, and wherein the shift output unit and the forward/reverse switching apparatus are arranged in the front-rear direction in a state where a shift unit input axis of the shift output unit and an axis of the output shaft are coaxial with each other.

9. The shift power transmission apparatus of a tractor according to claim 1, wherein the pump shaft and the motor shaft are aligned in a straight line.

10. The shift power transmission apparatus of a tractor according to claim 9, wherein the apparatus further comprises a forward/reverse switching apparatus that is provided on a rear side of the shift output unit, the forward/reverse switching apparatus having an input shaft to which motive power that is output from the shift output shaft of the shift output unit is input, the forward/reverse switching apparatus being configured to output motive power of the input shaft to the travel apparatus by converting the motive power into forward travel motive power or reverse travel motive power, and wherein the shift output unit and the forward/reverse switching apparatus are arranged in the front-rear direction in a state where an axis of the input shaft and an axis of the shift output shaft are coaxial with each other.

11. A tractor comprising the shift power transmission apparatus of a tractor according to claim 1.

12. The shift power transmission apparatus of a tractor according to claim 1, wherein the apparatus further comprises a forward/reverse switching apparatus that is provided on a rear side of the shift output unit, the forward/reverse switching apparatus having an input shaft to which motive power that is output from the shift output shaft of the shift output unit is input, the forward/reverse switching apparatus being configured to output motive power of the input shaft to the travel apparatus by converting the motive power into forward travel motive power or reverse travel motive power, and wherein the shift output unit and the forward/reverse switching apparatus are arranged in the front-rear direction in a state where an axis of the input shaft and an axis of the shift output shaft are coaxial with each other.

13. A shift power transmission apparatus of a tractor, the apparatus comprising:

a hydrostatic continuously variable transmission unit that includes a hydraulic pump and a hydraulic motor, and is configured to receive motive power of an engine and output motive power of stepless rotational speed by changing a speed of the received motive power;

a combined planetary power transmission unit that is configured to receive speed-changed output of the continuously variable transmission unit and motive power of the engine that is not subjected to speed change action by the continuously variable transmission unit, and combine the received speed-changed output and the motive power of the engine, and output combined motive power; and a shift output unit that includes a plurality of stage clutches and a shift output shaft that supports the plurality of stage clutches in a state of being arranged in a vehicle front-rear direction, the shift output unit being configured to receive the combined motive power from the combined planetary power transmission unit, and divide a speed range of the received combined motive power into a plurality of stages, and output the received combined motive power from the shift output shaft toward a travel apparatus, wherein the continuously variable transmission unit is provided in a state where the continuously variable transmission unit is located further toward a vehicle rear side than the engine, the continuously variable transmission unit having a motor shaft and a pump shaft that extend in the vehicle front-rear direction, wherein the combined planetary power transmission unit is provided in a state where the combined planetary power transmission unit is located further toward the vehicle rear side than the engine, the combined planetary power transmission unit having a single planetary unit input axis and a single planetary unit output axis, the planetary unit input axis extending in a direction along the vehicle front-rear direction and parallel to the motor shaft and the pump shaft, wherein the shift output unit is provided in a state where the shift output unit is located further toward the vehicle rear side than the combined planetary power transmission unit is, the shift output unit having a single shift unit input axis that extends coaxial with the planetary unit output axis, wherein the apparatus further comprises a power transmission unit that is configured to transmit the motive power of the engine to the continuously variable transmission unit and the combined planetary power transmission unit, the power transmission unit including a rotary power transmission shaft, a pump transmission unit and a planetary transmission unit, the rotary power transmission shaft being located further toward the vehicle rear side than the engine in a state of being interlockingly joined to an output shaft of the engine, the rotary power transmission shaft extending in a direction along the vehicle front-rear direction and parallel to the motor shaft and the pump shaft, the pump transmission unit being configured to input motive power of the rotary power transmission shaft to the pump shaft, and the planetary transmission unit being configured to input motive power of the rotary power transmission shaft to the combined planetary power transmission unit, wherein the continuously variable transmission unit is located at the same position as at least one of the combined planetary power transmission unit and the shift output unit in the vehicle front-rear direction, wherein the apparatus further comprises a forward/reverse switching apparatus that is provided on a rear side of the shift output unit, the forward/reverse switching apparatus having an input shaft to which motive power that is output from the shift output shaft of the shift output unit is input, the forward/reverse switching apparatus being configured to output motive power of the input shaft to the travel apparatus by converting the motive power into forward travel motive power or reverse travel motive power, and wherein the shift output unit and the forward/reverse switching apparatus are arranged in the front-rear direction in a state where an axis of the input shaft and an axis of the shift output shaft are coaxial with each other.

14. The shift power transmission apparatus of a tractor according to claim 13, wherein the pump shaft is located further toward the vehicle rear side than the motor shaft.

15. The shift power transmission apparatus of a tractor according to claim 14, wherein the pump transmission unit is located further toward the vehicle rear side than the shift output unit.

16. The shift power transmission apparatus of a tractor according to claim 13, wherein the pump shaft is located further toward the vehicle rear side than the motor shaft.

17. The shift power transmission apparatus of a tractor according to claim 13, wherein the pump transmission unit is located further toward the vehicle rear side than the shift output unit.

18. A shift power transmission apparatus of a tractor, the apparatus comprising:
- a hydrostatic continuously variable transmission unit that includes a hydraulic pump and a hydraulic motor and is configured to receive motive power of an engine and output motive power of stepless rotational speed by changing a speed of the received motive power;
- a combined planetary power transmission unit that is configured to receive speed-changed output of the continuously variable transmission unit and motive power of the engine that is not subjected to speed change action by the continuously variable transmission unit, and combine the received speed-changed output and the motive power of the engine, and output combined motive power; and
- a shift output unit that includes a plurality of stage clutches and a shift output shaft that supports the plurality of stage clutches in a state of being arranged in a vehicle front-rear direction, the shift output unit being configured to receive the combined motive power from the combined planetary power transmission unit, and divide a speed range of the received combined motive power into a plurality of stages, and output the received combined motive power from the shift output shaft toward a travel apparatus, wherein the continuously variable transmission unit is provided in a state where the continuously variable transmission unit is located further toward a vehicle rear side than the engine, the continuously variable transmission unit having a motor shaft and a pump shaft that extend in the vehicle front-rear direction, wherein the combined planetary power transmission unit is provided in a state where the combined planetary power transmission unit is located further toward the vehicle rear side than the engine, the combined planetary power transmission unit having a single planetary unit input axis and a single planetary unit output axis, the planetary unit input axis extending in a direction along the vehicle front-rear direction and parallel to the motor shaft and the pump shaft, wherein the shift output unit is provided in a state where the shift output unit is located further toward the vehicle rear side than the combined planetary power transmission unit is, the shift output unit having a single shift unit input axis that extends coaxial with the planetary unit output axis, wherein the apparatus further comprises a power transmission unit that is configured to transmit the motive power of the engine to the continuously variable transmission unit and the combined planetary power transmission unit, the power transmission unit including a rotary power transmission shaft, a pump transmission unit and a planetary transmission unit, the rotary power transmission shaft being located further toward the vehicle rear side than the engine in a state of being interlockingly joined to an output shaft of the engine, the rotary power transmission shaft extending in a direction along the vehicle front-rear direction and parallel to the motor shaft and the pump shaft, the pump transmission unit being configured to input motive power of the rotary power transmission shaft to the pump shaft, and the planetary transmission unit being configured to input motive power of the rotary power transmission shaft to the combined planetary power transmission unit, wherein the continuously variable transmission unit is located at the same position as at least one of the combined planetary power transmission unit and the shift output unit in the vehicle front-rear direction, wherein the apparatus further comprises a forward/reverse switching apparatus that is provided on a rear side of the shift output unit, the forward/reverse switching apparatus being configured to receive motive power that is output from the shift output unit, and output the received motive power from an output shaft to the travel apparatus by converting the motive power into forward travel motive power or reverse travel motive power, and wherein the shift output unit and the forward/reverse switching apparatus are arranged in the front-rear direction in a state where a shift unit input axis of the shift output unit and an axis of the output shaft are coaxial with each other.

19. The shift power transmission apparatus of a tractor according to claim 6, wherein the pump shaft is located further toward the vehicle rear side than the motor shaft.

* * * * *